(12) United States Patent
Lepercq

(10) Patent No.: US 12,319,014 B2
(45) Date of Patent: Jun. 3, 2025

(54) FIBRE-REINFORCED COMPOSITE TUBULAR SHAFTS AND MANUFACTURE THEREOF

(71) Applicant: North Thin Ply Technology Sarl, Renens (CH)

(72) Inventor: Xavier Lepercq, Renens (CH)

(73) Assignee: North Thin Ply Technology Sarl, Renens (CH)

( * ) Notice: Subject to any disclaimer, the term of this patent is extended or adjusted under 35 U.S.C. 154(b) by 587 days.

(21) Appl. No.: 17/618,530

(22) PCT Filed: May 28, 2020

(86) PCT No.: PCT/EP2020/064881
§ 371 (c)(1),
(2) Date: Dec. 13, 2021

(87) PCT Pub. No.: WO2020/259951
PCT Pub. Date: Dec. 30, 2020

(65) Prior Publication Data
US 2022/0242062 A1    Aug. 4, 2022

(30) Foreign Application Priority Data

Jun. 25, 2019   (GB) .................................. 1909124

(51) Int. Cl.
*B29C 70/32*    (2006.01)
*B29C 53/56*    (2006.01)
(Continued)

(52) U.S. Cl.
CPC ............ *B29C 70/32* (2013.01); *B29C 53/562* (2013.01); *B29C 53/566* (2013.01);
(Continued)

(58) Field of Classification Search
CPC ... B29C 53/562; B29C 53/566; B29C 53/582; B29C 53/585; B29C 70/205;
(Continued)

(56) References Cited

U.S. PATENT DOCUMENTS 3,530,567 A    9/1970   Secord
3,970,495 A    7/1976   Ashton et al.
(Continued)

FOREIGN PATENT DOCUMENTS

CN    103302865 A    9/2013
CN    107645983 A    1/2018
(Continued)

OTHER PUBLICATIONS

Office action in related Chinese Application No. 202080053510.9 issued on Jan. 9, 2024, with English translation.
(Continued)

*Primary Examiner* — Yan Lan
(74) *Attorney, Agent, or Firm* — POLSINELLI PC

(57) ABSTRACT

An elongate tubular shaft body having a stack of wrapped layers of fibrous reinforcement in a resin matrix, a portion of the stack of wrapped layers circumferentially surrounding a first surface part of a fibrous layer has a non-constant width which varies non-linearly with a change in radius of an inner elongate circumferential surface in the portion, and wherein the fibrous reinforcement has fibres that are, along the length of the elongate tubular body, constantly oriented with respect to a cylindrical coordinate system about the longitudinal axis of the elongate tubular body, the fibre orientation in any said portion being independent of the geometry of the inner and outer elongate circumferential surfaces of that portion.

19 Claims, 13 Drawing Sheets

(51) Int. Cl.
  *B29C 53/58* (2006.01)
  *B29C 70/20* (2006.01)
  *A63B 53/10* (2015.01)
  *A63B 60/00* (2015.01)
  *B29L 23/00* (2006.01)
  *F16C 3/02* (2006.01)

(52) U.S. Cl.
  CPC .......... *B29C 53/582* (2013.01); *B29C 53/585* (2013.01); *B29C 70/205* (2013.01); *A63B 53/10* (2013.01); *A63B 60/00* (2015.10); *A63B 2209/02* (2013.01); *B29L 2023/22* (2013.01); *F16C 3/026* (2013.01); *F16C 2220/28* (2013.01)

(58) Field of Classification Search
  CPC ...... B29C 70/32; F16C 2220/28; F16C 3/026; A63B 2209/02; A63B 53/10; A63B 60/00
  See application file for complete search history.

(56) References Cited

U.S. PATENT DOCUMENTS

| | | |
|---|---|---|
| 5,427,373 A | 6/1995 | Kusumoto |
| 5,538,769 A | 7/1996 | Sandman, Jr. |
| 5,876,322 A | 3/1999 | Piramoon |
| 5,888,601 A | 3/1999 | Quigley et al. |
| 6,030,371 A | 2/2000 | Pursley |
| 2009/0098234 A1 | 4/2009 | Hasegawa et al. |
| 2011/0097526 A1 | 4/2011 | Goering |
| 2017/0225383 A1 | 8/2017 | Taneda et al. |
| 2017/0274603 A1 | 9/2017 | Iwata et al. |
| 2017/0361546 A1 | 12/2017 | Zhang et al. |

FOREIGN PATENT DOCUMENTS

| | | |
|---|---|---|
| EP | 0276169 A2 | 1/1988 |
| EP | 0291639 A1 | 11/1988 |
| EP | 2293920 B1 | 10/2012 |
| GB | 2177062 A | 1/1987 |
| JP | H06-007058 A | 1/1994 |
| JP | H08-281814 A | 10/1996 |
| JP | 2991629 B2 | 12/1999 |
| JP | 2001-46566 A | 2/2001 |
| JP | 2013-509505 A | 3/2013 |
| KR | 950010502 B1 | 9/1995 |
| WO | 91/14480 | 10/1991 |
| WO | 2011/072846 A2 | 6/2011 |

OTHER PUBLICATIONS

International Search Report and Written Opinion in related international application No. PCT/EP2020/064881 issued on Sep. 1, 2020.

Search Report under Section 17 in priority Great Britain application No. 1909124.8 issued on Dec. 12, 2019.

International Preliminary Report on Patentability in related international application No. PCT/EP2020/064881 issued on Dec. 28, 2021.

Examination Report from the counterpart Japanese issued on Dec. 13, 2024, JP Application No. 2021-577106, with English translation (9 pages).

FIBRE-REINFORCED COMPOSITE TUBULAR SHAFTS AND MANUFACTURE THEREOF

FIELD OF THE INVENTION

The present invention relates to a method of manufacturing an elongate tubular shaft comprised of a fibre-reinforced resin matrix composite material. The present invention also relates to an elongate tubular shaft comprised of a fibre-reinforced resin matrix composite material.

BACKGROUND OF THE INVENTION

It is commonly known in the art of composite materials that a composite material tube, otherwise called a tubular shaft, may be produced by a method in which a tape of preform material is wound, for example helically wound, in a superposed manner around a metallic mandrel. Then in a moulding process pressure is applied with a compacting system on this composite structure, the thermoset and/or thermoplastic resin matrix is consolidated, and then the mandrel is removed from the moulded tubular product.

Alternatively the preform material may be in the form of a sheet that is wound along a rotational axis having a direction aligned with respect to a longitudinal axis of the mandrel. In particular, such composite tubes are generally made by a roll wrapping process. The sheet may be oriented perpendicular, or at an inclined angle, to the longitudinal axis of the mandrel. Roll wrapping comprises wrapping around the mandrel individual preforms or individual layers of preform material having the same or different length as the tube and a width corresponding to a certain number of revolutions around the mandrel.

The preform material may comprise a fibrous layer that consists of dry fibrous material, i.e. fibrous material which is free of a resin material, for example a thermoset and/or thermoplastic resin material, that is subsequently used to form the resin matrix of the composite material. After the fibrous layer has been wound as described above, the fibrous material may be coated by, impregnated by or infused by a resin material prior to or during the moulding step. Alternatively, the preform material may comprise a prepreg material. Such prepreg material is widely used in the manufacture of composite parts and structures. Prepreg material is a combination of thermoset and/or thermoplastic resin matrix and fibre reinforcement, in which the resin at least partially, typically completely, impregnates the fibre reinforcement.

When winding a preform or prepreg, either helically using a narrow tape, or by roll wrapping a sheet aligned perpendicularly or at an inclination with respect to the mandrel, around a mandrel that has other than a cylindrical surface, i.e. a cylindrical surface provided by a circular cross-section of a given radius extending along the entire length of the mandrel, there can be significant technical problems.

A first technical problem is that since the cross-section of the mandrel changes along the length of the mandrel, the prepreg can become skewed relative to the desired wrapping direction. This can cause wrinkles and fibre mis-alignment to be present in the wrapped elongate tube, which can seriously degrade the mechanical performance, and visual appearance, of the resultant elongate tubular shaft comprised of the fibre-reinforced resin matrix composite material formed from the prepreg.

For high performance composite material products it is essential that the fibre orientation and alignment along the entire length of the tubular shaft is maintained within the desired close tolerances in order to achieve high mechanical properties.

Fibre mis-alignment is a particular problem in the manufacture of non-cylindrical tubes, most particularly when product uniformity and consistency is a key performance parameter.

Another problem in the manufacture of non-cylindrical tubes having complex tube geometry is that the fibre layers can be inadvertently bent, twisted or folded, leading to the undesired formation of wrinkles in the preform layers that are manifested as misaligned or bent fibres or even voids in the final moulded composite material product.

Moreover, wrinkles and fibre mis-alignment can lead to a lack of consistency in performance between plural tubular products. Known manufacturing methods can encounter significant production problems in attaining such desired properties.

A second technical problem is that to accommodate changes in the geometry of the mandrel along its length, this can require a high level of manual intervention during the manufacturing process, and consequently a low level of automation. This increases manufacturing cost and complexity, and reduces the consistency and uniformity of plural tubular products.

A third technical problem is that such known processes can generate a high level of prepreg waste as a result of the prepreg tape or sheet having to be individually cut or tailored to remove excess material from the mandrel, or as a result of excess material having to be removed from the tubular product following the moulding step, or as a result of the manufactured tubular products being rejected by failing to meet the desired quality.

Furthermore, it is known to manufacture sports articles such as golf club shafts, fishing rods, rackets, etc. from a fibre-reinforced resin matrix composite material, in particular a carbon fibre composite material. However, elongate tubular shafts of carbon fibre composite material tend to suffer from the problem of exhibiting non-uniform properties, in particular a non-uniform wall thickness which leads to undesired variations in flexural stiffness along the shaft, in particular when the flexural force is applied in different rotational orientations around the axis of the shaft. Tubular sports articles often need to incorporate controlled variable thickness in order locally to control the stiffness of the article; however, it is difficult to automate a manufacturing process reliably and repeatably to manufacture such controlled variable thickness with a high degree of uniformity and consistency for multiple products.

GB-A-2177062 discloses the manufacture of composite material components in which a prepreg tape is wound onto a frusto-conical mandrel. The tape is wound so that each successive revolution of wound tape overlaps the preceding revolution of wound tape by approximately 50% of the tape width. The tape width (W) is defined by the expression $W = nt/\tan \alpha$ where t is the tape thickness, $\alpha$ is the cone angle in degrees of the mandrel, and n is the number of tape layers or tapes wound in one pass of winding, so that as n increases the tape width must increase proportionally. Although it is stated that the method of filament winding on a frusto-conical surface avoids distortion that would occur if a tape were to be wound thereon with edge to edge contact instead of overlapping and that no large gaps within the wound material are formed, nevertheless the method cannot ensure accurate filament alignment for any significant length of the tubular component or for any significant number of filament windings. This manufacturing method therefore suffers from a problem that the diameter of the mandrel increases, the fibres in the prepreg, and therefore in the final composite material, will become progressively misaligned, causing a reduction in the mechanical properties of the component and a change in mechanical properties along the length of the component. Furthermore, along the length of the component the angles of any fibres relative to the longitudinal axis of the mandrel, and thus of the component, vary and the fibres become progressively misaligned, or twisted, relative to the longitudinal axis with increasing diameter of the mandrel and component. In the pre-wound prepreg the fibre orientations may be consistently straight and accurately aligned along desired axes in the prepreg; however, in the final wound component the fibre orientations may not be consistently oriented and may not be accurately aligned along desired axes in the component. Furthermore, there is no disclosure how accurately to manufacture a complex shape other than a geometric frustoconical tube.

US-A-2011/0097526 discloses a woven fiber preform for forming a fiber reinforced composite incorporating the preform. The woven preform includes a plurality of warp and weft yarns or fibers interwoven to form a continuous spiral fabric. The spiral fabric may take the shape of an Archimedes spiral. The weft yarns in the preform may have a uniform or variable pick spacing, or a uniform or variable angular separation. The spiral fabric of the Archimedes spiral may be assembled or wrapped to form a conical shell structure, which could be a portion of a spinner or an exit cone. This disclosure suffers from a problem that the preform has a complex specific spiral geometry and can only be used to make a specific geometric structure of a conical shell. Moreover, if the weft yarns have uniform spacing and uniform angular separation, then in the conical shell the yarns become misaligned; however, if the weft yarns have variable spacing and/or variable angular separation, then although in the conical shell the yarns can be aligned conically the preform is very complicated to weave with a variable fibre structure, and each preform can only be used to make a specific geometric shape. There is no disclosure how in practice to make such a very complicated fabric for the preform. Furthermore, there is no disclosure how accurately to manufacture a complex shape other than a geometric conical shell.

US-A-2003/0056846 discloses a length of fabric with a variable width to form a tube of variable diameter. This disclosure suffers from a problem that the individual tube has a specific arrangement of the warp and weft fibres that can only be used to make a specific geometric structure of a variable diameter tube. The fabric is very complicated to weave with a variable fibre structure. There is no disclosure how to control the outer geometry of the tube.

WO-A-2004/067264 discloses a method of depositing inclined fibrous layers from a continuous wound band onto a support that may have variable diameter. This disclosure suffers from a problem that the method is very complex. Furthermore, there is no disclosure how accurately to manufacture a complex shape other than cylindrical or frustoconical tubular shapes from the inclined fibrous layers. There is no disclosure how to provide fibres oriented in the longitudinal direction along a substantial length, or in particular along the entire length, of the tube.

The aim of the present invention is therefore at least partially to overcome one or more of the above-described problems encountered by known methods for the manufacture of composite material tubular shafts.

The present invention accordingly aims to provide an improved manufacturing method for an elongate tubular shaft comprised of a fibre-reinforced resin matrix composite material, in particular in which the elongate tubular shaft can exhibit high quality mechanical properties even though the shaft may have a non-uniform thickness, cross-section and/or external or internal shape and dimensions along the length of the shaft.

Most particularly, present invention aims to provide an improved manufacturing method for an elongate tubular shaft comprised of a fibre-reinforced resin matrix composite material, which can be automated in order reliably, consistently and repeatably to provide, in a low cost production method, a tubular shaft having a highly concentric wall structure, with a uniformly controlled wall thickness around the axis of the shaft and accurate control of fibre alignment around the axis of the shaft, which in turn can provide that the shaft exhibits constant flexural properties around the axis of the shaft.

The present invention further aims to provide an improved manufacturing method for an elongate tubular shaft comprised of a fibre-reinforced resin matrix composite material which can increase the design possibilities of the ultimate tubular product by enabling complex tube geometries to be consistently manufactured, preferably by using an automated or automatable manufacturing method.

Finally, the present invention also aims to provide an improved elongate tubular shaft comprised of a fibre-reinforced resin matrix composite material which has a non-cylindrical internal circumferential surface and cross-section. In particular, the present invention also aims to provide an improved elongate tubular shaft comprised of a fibre-reinforced resin matrix composite material yet which can exhibit highly accurate and consistent fibre alignment around the axis of the shaft, which in turn can provide high quality mechanical properties along the length of the shaft, even in the case that the shaft incorporates complex tube geometries.

SUMMARY OF THE INVENTION

The present invention provides a method of manufacturing an elongate tubular shaft comprised of a fibre-reinforced resin matrix composite material. The method of the preferred embodiments of the present invention provides that each fibre is constantly oriented with respect to a cylindrical coordinate system about the axis of rotation of the mandrel.

The present invention also provides an elongate tubular shaft comprised of a fibre-reinforced resin matrix composite material.

The preferred embodiments of the present invention can provide a method of manufacturing an elongate tubular shaft on a mandrel in which the cross-section of the mandrel changes along the length of the mandrel, and thereby has a "complex" shape.

Despite such a complex mandrel shape, the orientation of the fibres can remain constant within a cylindrical coordinate system associated with the axis of rotation of the mandrel, even when using "long" fibres having a length of at least 50 mm, and the "long" fibres may have a length of more than 10 metres, at least some of which fibres may individually extend along the entire length of the elongate tubular shaft.

This technical effect and advantage to achieve highly consistently accurate fibre orientation and alignment of such long fibres in an elongate tubular shaft formed from one or more wrapped preform layers is believed by the present inventors to be unique in the composite material art, and allows to increase the performance of fibre-reinforced composite structures for applications where product consistency is a key design and performance factor. Furthermore, by providing highly aligned "long" fibres having a length of at least 50 mm, or even a length of more than 10 metres, the mechanical properties, in particular the strength and toughness, of the composite material are increased.

The inside tube geometry can have a complex shape, and can incorporate one or any combination of the following geometric or structural features: cone with increasing or/and decreasing or/and neutral slope; one or multiple bumps or protrusions; one or multiple ledges; one or multiple re-entrant grooves; or one or multiple depressions; a section of any shape and that can also vary along the length of the tube. Correspondingly, the outside tube geometry can have a complex shape, and can incorporate one or any combination of the following geometric or structural features: cone with increasing or/and decreasing or/and neutral slope; one or multiple bumps or protrusions; one or multiple ledges; one or multiple re-entrant grooves; or one or multiple depressions.

The preferred embodiments of the present invention can provide a method of manufacturing an elongate tubular shaft on a mandrel in which the shaft has a complex tube geometry and can be moulded to a near net shape, and this can be achieved in one wrapping and moulding operation with very little waste and in a fully automated way, thus improving productivity and repeatability while reducing waste.

Furthermore, the preferred embodiments of the present invention can provide a method of manufacturing an elongate tubular shaft on a mandrel in which there is an ability to control independently the inside tube and outside tube geometry, which increases the design space in a general way for the manufacture of tubular shafts.

The preferred embodiments of the present invention can provide a method of manufacturing an elongate tubular shaft in which even though the cross-section of the mandrel changes along the length of the mandrel, the preform does not become skewed relative to the desired wrapping direction. Accordingly, wrinkles and fibre mis-alignment can be avoided or minimized in the wrapped elongate tube. The resultant elongate tubular shaft comprised of the fibre-reinforced resin matrix composite material can reliably, and consistently and repeatably, exhibit a high quality mechanical performance, and visual appearance. The fibre orientation and alignment along the entire length of the tubular shaft can be maintained within the desired close tolerances in order to achieve high mechanical properties.

The preferred embodiments of the present invention can also provide a high level of automation, and a low level of, or no, manual intervention during the manufacturing process which accommodates changes in the geometry of the mandrel along its length, particularly when manufacturing tubes having a complex geometry. The manufacturing cost and complexity is reduced, and the uniformity of plural tubular products is increased, and the manufacturing time can be decreased, as compared to known manufacturing methods, particularly when manufacturing tubes having a complex geometry.

The preferred embodiments of the present invention can also avoid or minimize preform waste depending on the complexity of the geometry of the elongate tubular shaft. In the preferred embodiments of the present invention, the shape and configuration of the or each preform layer to be wrapped around the mandrel is pre-calculated prior to the wrapping step, based on parameters of the combination of the thickness of the preform layer, the mandrel geometry and the tube geometry, to provide a complex preform geometry that is adapted to be wrapped perpendicularly around a complex mandrel geometry to form a complex tube geometry. By pre-calculating such a complex preform shape prior to the wrapping step, the wrapping can be automated and waste minimized, because the preform layer is cut and subsequently wrapped and then moulded to a "near net shape" which obviates or minimizes waste generation during or after the wrapping and moulding steps. The wrapping to form a preform tube near to the final product shape can consequently reduce waste, and also reduce or avoid any time required by a finishing process for finishing the final moulded tubular shaft, for example a grinding process.

In summary, the preferred embodiments of the present invention can also provide a highly flexible automated manufacturing method for making complex tubular shafts composed of composite material. Consequently, the preferred embodiments of the present invention further provide a tubular shaft composed of composite material which can have on the one hand a complex geometry but one the other hand highly consistently and accurately aligned fibres, with associated high mechanical properties.

The tubular shafts produced by the preferred embodiments of the present invention can be used to manufacture sports articles such as golf club shafts, fishing rods, rackets, masts for boats and windsurfing boards, etc., or any other high quality composite material tubular products, from a fibre-reinforced resin matrix composite material, in particular a glass or carbon fibre composite material.

BRIEF DESCRIPTION OF THE DRAWINGS

Other features and advantages of the present invention will appear more clearly from the detailed description of several non-limiting embodiments of the invention which are illustrated by the attached drawings in which.

DETAILED DESCRIPTION OF EMBODIMENTS OF THE INVENTION

Figure 1:
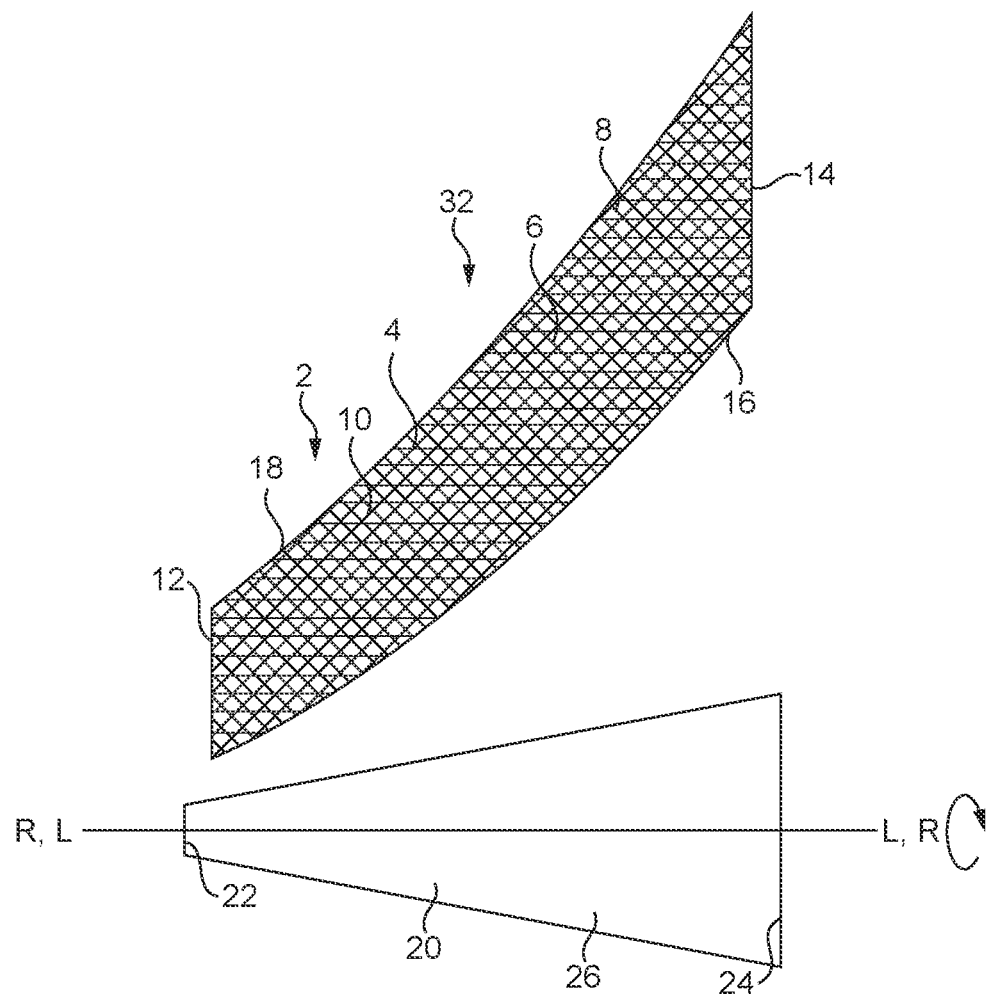
FIG. 1 is a schematic plan view of a preform layer that is suitable for use in a method of manufacturing an elongate tubular shaft comprised of a fibre-reinforced resin matrix composite material in accordance with an embodiment of the present invention.
Figure 2A:
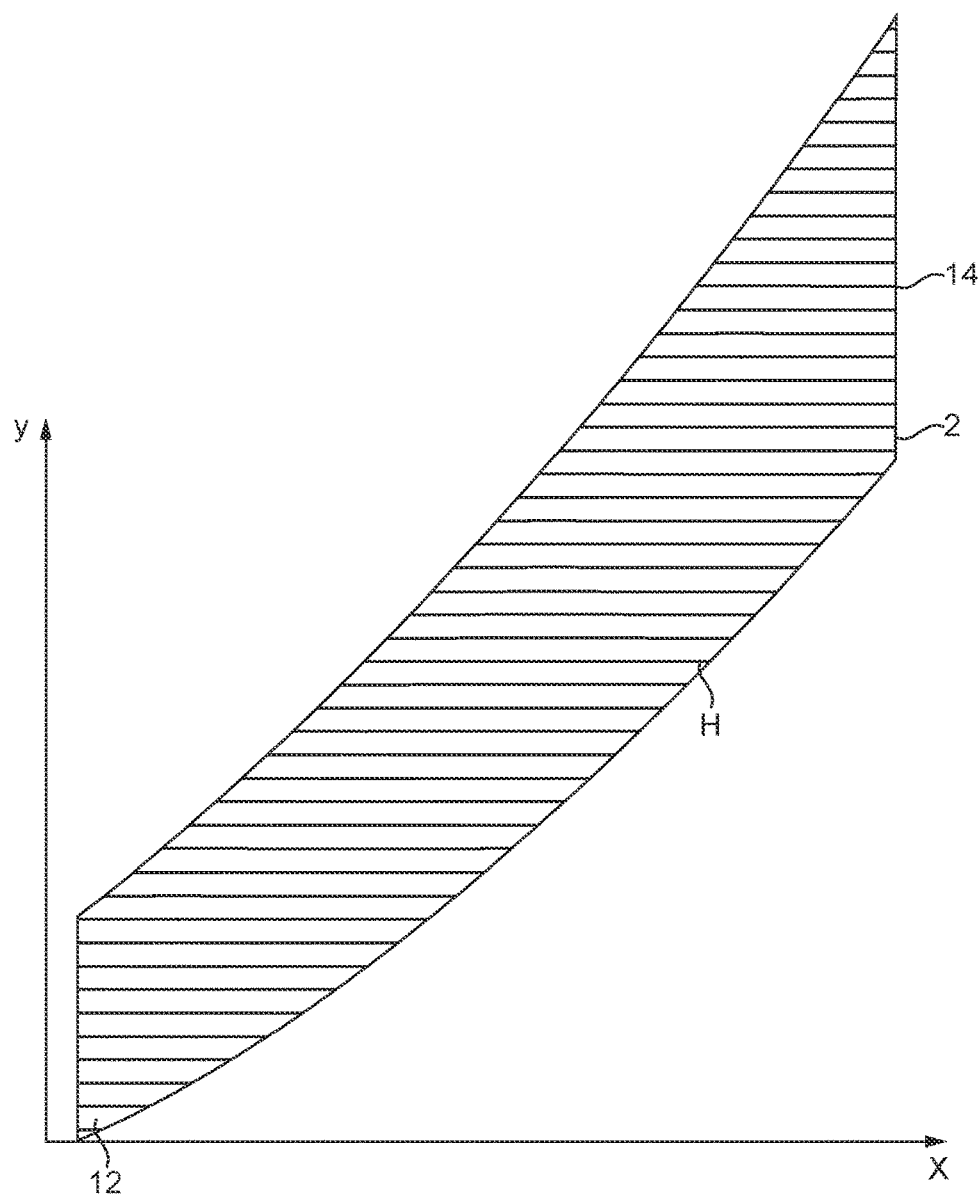
FIGS. 2a and 2b illustrate schematically, respectively, a plan view of a preform layer relative to a rectangular coordinate system, and a cross-section through the preform layer after wrapping around the mandrel in accordance with an embodiment of the present invention.
Figure 2B:
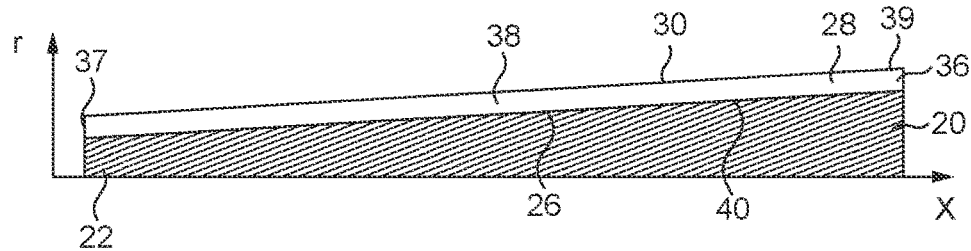

FIG. 1 and FIGS. 2a and 2b illustrate an example of a flexible preform layer 2 suitable for use in a method of manufacturing an elongate tubular shaft according to an embodiment of the present invention. The preform layer 2 is flexible which, in this specification, means that, as described hereinafter, the preform layer 2 can be wound rotationally around a mandrel to form a desired tubular shape. The flexible preform layer 2 comprises at least one ply 4 of fibrous reinforcement 6. The preform layer 2 has a front major surface 10. Preferably, the preform layer 2 has a constant thickness. However, in other embodiments the thickness may vary, optionally in a controlled manner, for example the thickness may vary linearly along the length of the preform layer 2. The thickness of the preform layer 2 is preferably within the range of from 0.015 to 5 mm, optionally from 0.1 to 2 mm.

The preform layer 2 has first and second end portions 12, 14, which are mutually spaced, and inner and outer edges 16, 18, which are mutually spaced. The inner and outer edges 16, 18 extend from the first end portion 12 towards the second end portion 14.

In accordance with the present invention, when the preform layer 2 is in a planar configuration, as shown in FIG. 1, at least the inner edge 16 is non-linear and a spacing between the inner and outer edges 16, 18 varies along a length of the preform layer 2 extending between the first and second end portions 12, 14.

Accordingly, there is a non-linear relationship between the geometrical shape and dimensions of the inner edge 16 of the preform layer 2 and the length of the preform layer 2 between the first and second end portions 12, 14. Correspondingly, there is a non-linear relationship between the spacing between the inner and outer edges 16, 18 and the length of the preform layer 2 between the first and second end portions 12, 14. Consequently, when the preform layer 2 is wrapped around a non-cylindrical mandrel as described below, there is a non-linear relationship between on the one hand the position of the inner edge 16, and the spacing between the inner and outer edges 16, 18, and on the other hand the position of the preform layer 2 along a length direction of the mandrel and the cumulative number of rotations of the preform layer 2 in a direction extending along the length direction of the mandrel, in particular along a longitudinal axis of the mandrel.

In the embodiment of FIG. 1, the first and second end portions 12, 14 each comprise a linear end, and the linear ends are mutually parallel. The inner and outer edges 16, 18 each comprise a curved edge. The inner edge 16 is convexly curved and the outer edge 18 is concavely curved. Consequently, in this embodiment the preform layer 2 is shaped and dimensioned so that when the preform layer 2 is in a planar configuration at least a portion of the inner edge 16 is curved, preferably convexly curved. However, in other embodiments the inner edge 16 and the outer edge 18 may have different geometries, for example the inner edge 16 may be concavely curved and/or the outer edge 18 may be convexly curved.

As is described hereinafter, the curvatures of the inner and outer edges 16, 18 are different and the inner and outer edges 16, 18 are not parallel. The shape and configuration of each of the inner and outer edges 16, 18 are determined based upon an analysis of the geometry of a mandrel around which the flexible preform layer 2 is to be wrapped to form the elongate tubular shaft, the thickness of the preform layer 2, and the shape and dimensions of the elongate tubular shaft.

The fibrous reinforcement 6 may have any fibre configuration, and may comprise woven fibres or non-woven fibres, for example in the form of unidirectional (UD) fibres, spread tow fibres, stitched fabrics, knitted or braided fabrics. The fibrous reinforcement 6 may comprises multiple fibres with the same or different orientations. The fibrous reinforcement 6 may comprise a single ply of fibres, or alternatively may comprise a stack of plural plies of fibres, the plies having the same or different fibre configurations.

When plural plies are present, although the entire preform layer 2 has a shape and dimensions defining the front major surface 10, the first and second end portions 12, 14, and the inner and outer edges 16, 18, each ply may optionally have a different shape and dimensions as compared to any other ply. In addition, each ply may comprise a combination of two or more ply portions arranged adjacent to each other. The preform layer 2, or one or more plies in the ply in preform layer 2, may include at least one hole therein, the hole or holes being surrounded by the preform layer 2.

The fibres of the fibrous reinforcement 6 may comprise any natural and/or synthetic fibres. Typically, the fibrous reinforcement 6 comprises glass, carbon, and/or aramid fibres, or cotton or jute fibres.

The preform layer 2 may comprise dry fibrous reinforcement 6, i.e. fibrous material which is free of a resin material, for example a thermoset and/or thermoplastic resin material, that is subsequently used to form the resin matrix of the composite material. After the preform layer 2 has been wound as described below, the dry fibrous reinforcement 6 may be coated by, impregnated by or infused by a resin material prior to or during the moulding step. For example, a liquid resin may be infused into the dry fibrous reinforcement 6 prior to or during the moulding step. In another embodiment, a coherent solid resin layer may be deposited adjacent to the dry fibrous reinforcement 6 prior to or during the moulding step. Other techniques to combine fibre and resin to form the fibre-reinforced resin matrix composite material will be apparent to those skilled in the art.

Alternatively, the preform layer 2 may comprise a prepreg material which is at least partly, optionally fully, impregnated by a resin.

The resin 8 may be a thermoplastic or thermosetting resin. Any thermoplastic or thermosetting resin known to be suitable for use in manufacturing fibrous preforms may be used. Typically, a thermosetting resin such as an epoxy resin is used in conjunction with glass and/or carbon fibres in the fibrous reinforcement 6. When a thermosetting resin is used, the preform layer 2 may comprise a prepreg, in which the fibrous reinforcement 6 is fully impregnated by the resin. In some embodiments, a single preform layer may be provided with different areas incorporating different resins, which may comprise a mixture of thermoplastic and/or thermosetting resins.

In alternative embodiments of the present invention, the preform layer 2 may comprise a dry fibrous reinforcement layer and a resin layer, composed of a thermosetting resin or a thermoplastic resin, and the preform layer and the resin layer are stacked upon each other. In further embodiments of the present invention, the resin in the preform layer 2, which is composed of a thermosetting resin or a thermoplastic resin, may be partially or totally pre-cured before the subsequent wrapping step as described below. In other embodiments of the present invention, the preform layer 2 may comprise a core material (not shown) and/or an adhesive material (not shown) on an upper surface of the preform layer 2 or the fibrous reinforcement 6. The core material may comprises a layer of a cellular material, for example a cellular foam, typically composed of a polymer such as a polyolefin or a polyester, or a honeycomb material. When a core material is provided, the core material is sandwiched between opposed layers of fibrous reinforcement after the wrapping step and in the final elongate tubular shaft manufactured according to the present invention.

In the method of the present invention, as is also shown in FIG. 1, an elongate mandrel 20 is provided. The mandrel 20 may be composed of a single part or multiple parts connected or assembled together. The mandrel 20 is typically composed of a metal, such as steel, but may alternatively be composed of a composite material, such as a fibre-reinforced resin matrix composite material.

The mandrel 20 has a longitudinal axis L-L, and opposite first and second ends 22, 24 which are mutually spaced along the longitudinal axis L-L. The mandrel 20 has an outer circumferential surface 26 that is non-cylindrical along at least a part of a length of the mandrel 20 extending along the longitudinal axis L-L. In the embodiment of FIG. 1, the outer circumferential surface 26 that is non-cylindrical is frusto-conical. However, as described hereinafter, the mandrel 20 may have any desired cross-sectional shape and dimensions, and additionally the cross-sectional shape and dimensions may vary along the length of the mandrel. The mandrel outer surface 26 can have a complex shape, and can incorporate one or any combination of the following geometric or structural features: cone with increasing or/and decreasing or/and neutral slope; one or multiple bumps or protrusions; one or multiple ledges; one or multiple re-entrant grooves; or one or multiple depressions; a section of any shape and that can also vary along the length of the mandrel 20.

The present invention pre-shapes the preform layer in accordance with the shape and dimensions of the mandrel, and of the final elongate tube, so that after wrapping the preform layer about the mandrel by rotation around the longitudinal axis of the mandrel, the desired elongate tube is produced irrespective of the specific individual geometry of the mandrel. Accordingly, such pre-shaping of the preform layer allows a wide variety of different mandrel geometries to be used and a similar wide variety of elongate tube geometries to be produced.

As described below with reference to various embodiments of the present invention, the first and second end portions 12, 14, and the inner and outer edges 16, 18, of the preform layer 2 may be provided with a variety of different shapes and dimensions to enable the preform layer 2 to be wrapped about a variety of different mandrel shapes and dimensions to manufacture elongate tubes of a variety of different shapes and dimensions. The common feature in these embodiments is that the preform layer, in particular at least the inner edge of the preform layer which contacts the outer circumferential surface of the mandrel during wrapping, is pre-shaped to control the wrapping relative to the individual mandrel.

In order to manufacture the elongate tubular shaft, the first end portion 12 of the preform layer 2 is located adjacent to the first end 22 of the mandrel 20 in a starting configuration. In the starting configuration, the inner edge 16 is oriented towards the mandrel 20 and the outer edge 18 is oriented away from the mandrel 20.

Then the preform layer 2 is wrapped about the mandrel 2 so that the outer circumferential surface 26 of the mandrel 20 is progressively covered by the wrapped preform layer 2 to form an elongate tube 28.

During this wrapping step, the mandrel 20 and the preform layer 2 are relatively rotated about an axis of rotation R-R that is along the longitudinal axis L-L of the mandrel 20. Typically, the mandrel 20 is rotated about the axis of rotation R-R to wrap the preform layer 2 about the mandrel 20, and the preform layer 2 is rotationally static. Alternatively the mandrel 20 is rotationally static and the preform layer 2 is rotated about the axis of rotation R-R to wrap the preform layer 2 about the mandrel 20.

Also during this wrapping step, the preform layer 2 is continuously fed, from the first end portion 12 to the second end portion 14 of the preform layer 2, onto the mandrel 20 along a feeding path 32 which is perpendicular to the longitudinal axis L-L of the mandrel 20 and thereby also perpendicular to the axis of rotation R-R.

The front major surface 10 is rotationally wrapped into surface contact with the outer circumferential surface 26. After the first wrap rotation, the front major surface 10 preferably at least partially overlaps with previously wrapped part of the preform layer 2 on the mandrel 20. As a result of the wrapping step, in the elongate tube 28 the inner edge 16 contacts the outer circumferential surface 26 of the mandrel 20 and the outer edge 18 is located at an outer circumferential surface 30 of the elongate tube 28.

Figure 3:
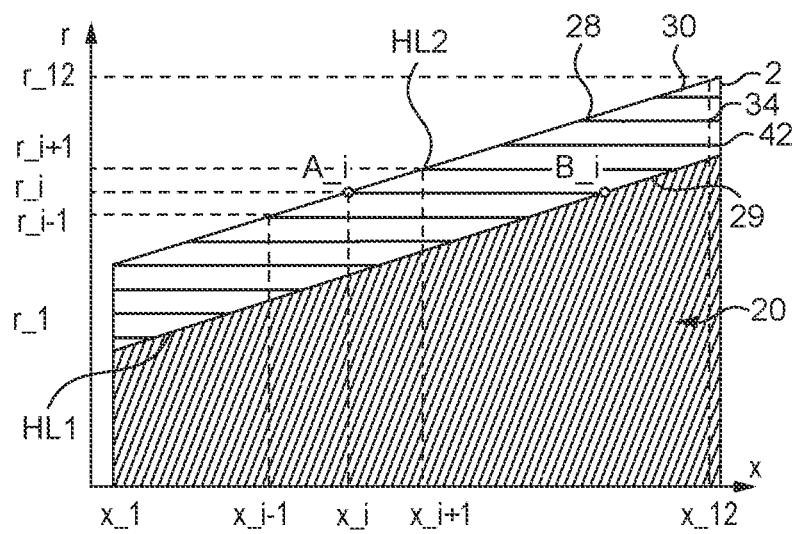
FIG. 3 is a graph illustrating in detail a cross-section through the layer structure of a wrapped preform layer on the mandrel in accordance with an embodiment of the present invention.

In particular, the inner edge 16 of the preform layer 2 is shaped and dimensioned so that during the wrapping step the inner edge 16 is continuously coincident with the outer circumferential surface 26 of the mandrel 20, whereby as shown in FIG. 3 the elongate tube 28 comprises a plurality of wrapped layers 34 forming a spiral 42 about the longitudinal axis L-L, wherein each wrapped layer 34 is constantly oriented with respect to a cylindrical coordinate system about the longitudinal axis L-L.

Preferably, during the wrapping step, along at least a part of the length of the elongate tube 28 at an inner surface 29 thereof a contact between at least a portion of the inner edge 16 and a region of the outer circumferential surface 26 of the mandrel 20 that is non-cylindrical forms a continuous inner helical line HL1, extending along a plurality (i.e. at least 2) of the wrapped layers 34, for example at least 10 wrapped layers 34, which is coincident with the outer circumferential surface 26 of the mandrel 20.

As a result of the combination of the specific geometry of the curved inner edge 16 and the regular frusto-conical circumferential surface 26 of the mandrel 20 having a constant angle of inclination to the longitudinal axis L-L, the continuous inner helical line HL1 has a uniform pitch between successive helical rotations of the wrapped layers 34. However, in other embodiments, for example having a non-regular non-cylindrical surface of the mandrel as described below, the pitch between successive helical rotations of the wrapped layers may be variable and non-linear.

In one embodiment, at least a portion of the outer edge 18 forms a continuous outer helical line HL2 at the outer surface 30 of the elongate tube 28 which is equidistant from the continuous inner helical line HL1 along the plurality of wrapped layers 34 so that the elongate tube 28 has a constant thickness along at least the said part of the length of the elongate tube 28.

Since the preform layer 2 is located on the mandrel in a particular orientation and wrapped about the longitudinal axis L-L of the mandrel 20, which thereby is also the longitudinal axis of the elongate tube 28, the orientation of the fibrous reinforcement in the elongate tube 28 can be controlled by providing a starting orientation of the fibrous reinforcement in the starting configuration.

In one typical embodiment, the fibrous reinforcement comprises structural fibres, for example structural fibres that are comprised in a unidirectional (UD) fibrous ply, that during the locating step are aligned in parallel with the longitudinal axis L-L and during the wrapping step are maintained constantly oriented with respect to a cylindrical coordinate system about the longitudinal axis L-L.

In the preferred embodiments of the present invention, the preform layer 2 is shaped and dimensioned so that when the preform layer 2 is wound around the mandrel 20 about the axis of rotation that coincides with the longitudinal axis L-L of the mandrel 20, and the preform layer 2 is continuously fed along the feeding path 32 which is perpendicular to the longitudinal axis L-L of the mandrel 20, each wrap rotation, apart from the first wrap rotation, of the preform layer 2 around the mandrel 20 at least partially covers, and for some wrap rotations may wholly cover, the immediately previous wrap rotation.

However, in some embodiments of the present invention the preform layer 2 may be shaped and dimensioned so that when the preform layer 2 is wound around the mandrel 20 about the axis of rotation that coincides with the longitudinal axis L-L of the mandrel 20, at least some of the wrap rotations, apart from the first wrap rotation, of the preform layer 2 around the mandrel 20 may be adjacent to or spaced from the immediately previous wrap rotation.

One or more preform layers may be comprised of more than one preform part which are adjacent to, or spaced from, each other along the length of the mandrel. The plural preform parts may be wrapped sequentially or at least partly simultaneously. Plural preform parts may be comprised of the same or different preform compositions, for example the same or different fabrics and/or resins and/or orientations.

After the preform layer 2 has been fully wrapped on the mandrel 20, in some preferred embodiments of the present invention a second preform layer (not shown) may be correspondingly wrapped over the first preform layer 2. Optionally, the second preform layer may be wrapped in the same or opposite rotational direction as the first preform layer 2 and/or the second preform layer may be wrapped in the same or opposite translational direction as the first preform layer 2. Further preform layers may be wrapped over the second preform layer. These embodiments provide multi-layer tubular structures which, in the finished composite material product, may exhibit increased mechanical properties as compared to a single-layer tubular structure.

For example, a preferred embodiment for the manufacture of a sports article such as a golf club shaft is a two-ply or three-ply preform, with the shaft comprising a laminate of two two-ply or three-ply preforms to form a four-ply of six-ply multilaminar structure. In each two-ply or three-ply preform, a first ply may comprise parallel oriented UD fibres which, after the wrapping step as described above, are oriented substantially longitudinally along the shaft, and one or two adjacent second plies each comprise parallel oriented fibres which, after the wrapping step as described above, are oriented helically around the shaft, for example at an angle of from 30 to 45 degrees relative to the longitudinal axis of the shaft. For example, a three-ply preform may provide fibres at 0, +45 and −45 degrees to the longitudinal axis of the shaft.

During the wrapping step, typically the preform layer(s) are wrapped under tension so that the initial wrapping locates the preform layer(s) fully in contact with the underlying surface, for example the outer circumferential surface of the mandrel for the first or only preform layer. This wrapping arrangement has particular application when the surface of the preform has a degree of tack, for example as exhibited by typical thermosetting resin-containing prepregs at room temperature. However, in alternative embodiments, particularly when the surface of the preform is tack-free, for example as exhibited by typical dry fibrous reinforcement, during the wrapping step the preform layer(s) may be wrapped without applying a tension to the preform layer(s), so that the initial wrapping is somewhat loose and locates the preform layer(s) only partly in contact with the underlying surface and/or not fully at the desired position in the final elongate tube. In such embodiments, after the wrapping step tension may be applied to the preform layer(s) to cause the preform layer(s) to be slid under tension into the desired position in the final elongate tube.

Thereafter, the elongate tube 20 is moulded on the mandrel 20 to form an elongate tubular shaft 36 comprised of a fibre-reinforced resin matrix composite material 38 formed from the preform layer 2. Before or during the moulding step, the resin material is provided in contact with the fibrous reinforcement 6 of the preform layer 2, and during the moulding step the resin material forms a resin matrix which incorporates the fibrous reinforcement 6.

As described above, in some embodiments the preform layer 2 may comprise a prepreg, in which case the wrapped preform layer(s) 2 may be subjected to elevated temperature, and optionally external pressure applied to the outer surface of the elongate tube 20, to form the moulded elongate tubular shaft 36.

In other embodiments, dry fibrous reinforcement 6 is wrapped around the mandrel 20, and thereafter, before or during the moulding step, the resin material is added so as to be provided in contact with the fibrous reinforcement 6 of the preform layer 6, for example by liquid resin infusion or by providing a coherent solid resin layer adjacent to the dry fibrous reinforcement which liquefies during the moulding process and impregnates the fibrous reinforcement 6.

Accordingly, during the moulding step the resin material forms a resin matrix which incorporates the fibrous reinforcement 6.

After the moulding step, the elongate tubular shaft 36 may be separated from the mandrel 20 to form a hollow tube; alternatively, the mandrel 20, or a part thereof, may be retained within the central longitudinal cavity 40 of the elongate tubular shaft 36 to form a solid component. In either case, the elongate tubular shaft 36 may be further processed to form a desired product, for example a golf club shaft, a fishing rod or any other elongate tubular article that may usefully be composed of a fibre-reinforced resin matrix composite material.

By providing that the inner edge 16 of the preform layer 2 is shaped and dimensioned so that during the wrapping step the inner edge 16 is continuously coincident with the outer circumferential surface 26 of the mandrel 20, whereby the elongate tube 28 comprises a plurality of wrapped layers 34 forming a spiral 42 about the longitudinal axis L-L, wherein each wrapped layer 34 is parallel to the longitudinal axis L-L, the shape and configuration of the preform layer 2 is predetermined based upon the geometry of the elongate tube, which can provide that each wrapped layer 34 is wrinkle-free and each region of the wrapped layer 34 is consistently aligned with the longitudinal axis L-L.

This provides a high quality composite structure in which the fibre orientations and layer configurations in the moulded tubular product are highly accurately controlled and consistently achieved along the entire length of the elongate tubular shaft 36.

In accordance with the preferred embodiments of the present invention, the preform layer 2 is shaped and dimensioned so that when the preform layer 2 is in a planar configuration at least a portion of the inner edge 16 is defined using a rectangular coordinate system having x and y axes. The x axis is parallel to a spacing between the first and second end portions 12, 14, and parallel to the axis of rotation R-R, and thereby also parallel to the longitudinal axis L-L of the mandrel 20 about which the preform layer 2 is wrapped. The y axis is parallel to a spacing between the inner and outer edges 16, 18. At least a portion of the inner edge 16 is defined by the relationship:

$$Bn = f(x_n^B, y_n^B),$$

B is the position of the inner edge relative to the rectangular coordinate system;
n=the number of rotations of the wrapped preform layer;

$$x_n^B = f(c_i, e),$$

where $c_i$=circumference of wrapped preform layer at Bn and e=thickness of the preform layer; and $$yi = \sum_{n=1}^{n=i} c_i,$$

where i=the total number of rotations of the wrapped preform layer at B.

In other words, the shape and dimensions of the inner edge 16, along its length relative to the longitudinal axis L-L, are a function of both the preform layer 2, in particular the thickness of the preform layer 2, and the elongate tube 28 that is formed, in particular the number of rotations of the wrapped preform layer 34 and the circumference of wrapped preform layer 34, at any given position along the length of the inner edge 16 relative to the longitudinal axis L-L.

In practice, this relationship can be determined for any given mandrel geometry by calculating the location of the inner edge 16 starting from a position at which the inner edge 16 adjoins the first end portion 12 of the preform layer 2, which is the part of the inner edge 16 which initially contacts the outer circumferential surface 26 of the mandrel 20 during the wrapping step.

From that starting position, a calculation is made of the desired location of the inner edge 16 on the outer circumferential surface 26 of the mandrel 20 after one wrapping rotation, and this calculation is a function of the difference in circumference of the mandrel 20 at zero wrapping and after one wrapping rotation, and the rate of change of that difference in circumference. For the second wrapping rotation a calculation is made of the desired location of the inner edge 16 on the outer circumferential surface 26 of the mandrel 20 after the second wrapping rotation, and this calculation is a function of the difference in circumference of the mandrel 20 between the first and second wrapping rotations, the rate of change of that difference in circumference, and the thickness of the preform layer 2. Thereafter, the shape and dimensions of the inner edge 16 are calculated for each successive wrapping rotation along the entire length of the inner edge 16.

A corresponding calculation is made for the outer edge 18 when the outer circumferential surface 30 of the elongate tube 28 has a non-cylindrical geometry, for example has a geometry which corresponds to the geometry of the mandrel 20. However, if the outer circumferential surface 30 of the elongate tube 28 has a cylindrical geometry, the outer edge 18 may comprise a linear edge parallel with the x axis, and thereby parallel with the longitudinal axis L-L of the mandrel 20.

By predetermining the precise geometry of the preform layer 2 based upon an analysis of how the preform layer 2 would progressively wrap about a given mandrel geometry, consistently reproducible wrapped layers 34 can be achieved that precisely match the mandrel geometry along the length of the mandrel 20.

Since the wrapping is perpendicular to the axis of rotation R-R, corresponding to the longitudinal axis L-L of the mandrel 20, the wrapping can be easily achieved and reliably controlled using a simple control system. This is because by geometrically matching the shape and configuration of the preform layer 2, including the thickness of the preform layer 2, to the shape and configuration of the mandrel 20 and the resultant elongate tube 28, such geometric matching can avoid complicated and problematic wrapping parameters.

In contrast, for example, in a conventional tube forming method, a preform tape is helically wound a mandrel at a winding angle that is at an acute angle to the longitudinal axis. The external diameter of the mandrel determines the internal diameter of the tube which is formed. As the diameter of the mandrel changes, the tape can easily become misaligned relative to the desired fibre orientations. For example, the change in diameter of the mandrel and tube being formed causes a change in the angle of the tape relative to the mandrel surface. This can cause wrinkles in the wrapped layers and misaligned fibres, and requires complicated and careful control, by associated control systems, of the wrapping process to avoid such fibre misalignment.

Accordingly, the present invention provides a reliable and consistent method of manufacturing composite material tubes having high quality fibre orientation and alignment which can be achieved using a low cost and simple manufacturing apparatus.

In FIG. 1, the flexible preform layer 2 has a shape and dimensions which have been determined to enable the flexible preform layer 2 to be wrapped about a frusto-conical mandrel 20 to form an elongate tubular shaft 28 which is frusto-conical and has a constant wall thickness.

Referring to FIG. 2, FIG. 2a is a plan view of the flexible preform layer 2 of FIG. 1 shown relative to the x and y axes of a rectangular coordinate system. FIG. 2b shows the flexible preform layer 2 after wrapping about the frusto-conical mandrel 20 to form the elongate tube 28, which is subsequently moulded to form the elongate tubular shaft 36, which is frusto-conical and has a constant wall thickness. The frusto-conical mandrel 20 has a circular cross-section.

As described above, the wrapping step progressively wraps the flexible preform layer 2 on the mandrel 20 from the first end portion 12 to the second end portion 14. In FIG. 2a, the horizontal lines H indicated on the preform layer 2 represent respective the beginning and end of successive wrap layers each time a wrapping revolution is completed. It can be seen that as the wrapping progresses from the first end portion 12 to the second end portion 14, the separation distance between the horizontal lines H progressively increases as a result of the increase in diameter of the outer surface 30 of the elongate tube 28 proceeding from the relatively small diameter end 37 to the relatively large diameter end 39 of the elongate tube 28, and a corresponding increase in circumference of each successive wrapped layer 34.

In the embodiment of FIGS. 1 and 2, the frustoconical surface 26 is inclined at an angle $\alpha$ to the longitudinal axis L-L of the mandrel 20. The preform layer 2 is shaped and dimensioned so that when the preform layer 2 is in a planar configuration the curved portion of the inner edge 16 is defined, using the rectangular coordinate system as described above, by the relationship:

$$Bn = f(x_n^B, y_n^B),$$

B is the position of the inner edge relative to the rectangular coordinate system;
n=the number of rotations of the wrapped preform layer;

$$x_n^B = \sum_{n=1}^{n=i} e/\tan\alpha,$$

where e=thickness of the preform layer and i=total number of rotations of the wrapped preform layer at B; and $$y_n^B = \sum_{n=1}^{n=i} 2\pi r_n,$$

where $r_n$=radius of the mandrel at rotation n.

For more complex tube geometries, this formula may be readily modified to define the shape and dimensions of only a part of a preform layer 2, which part is intended to be wrapped over less than one revolution of the mandrel 20, for example by calculating a proportion of the circumference $2\pi r_n$.

Referring to FIG. 3, this figure illustrates the wrapping of the preform layer 2 around the mandrel 20 to form the elongate tube 28 comprised of plural wrapped layers 34. The mandrel 20 is frusto-conical with a constant angle of inclination a to the longitudinal axis of the mandrel 20. The preform layer 2 has a constant thickness, and the resultant elongate tube 28 has a constant wall thickness. In FIG. 3, within the illustration of the elongate tube 28 the horizontal lines representing successive wrapped layers 34 of the preform layer 2 wrapped around the mandrel 20 to form the elongate tube 28.

As the preform layer 28 is wrapped cylindrically around the mandrel 20, the radius of each horizontal line is thus determined by the following equation where $r_0$ is the external radius of the mandrel at the starting point and e is the preform layer thickness:

$$\begin{cases} r_1 = r_0 + e \\ r_{i+1} = r_i + e \end{cases}$$

Each horizontal line is defined by two points A and B that intersect respectively with the outer tube diameter and inner tube diameter with the following coordinates:

$$A_i(x_i^A, r_i) \text{ and } B_i(x_i^B, r_i)$$

Figure 4:
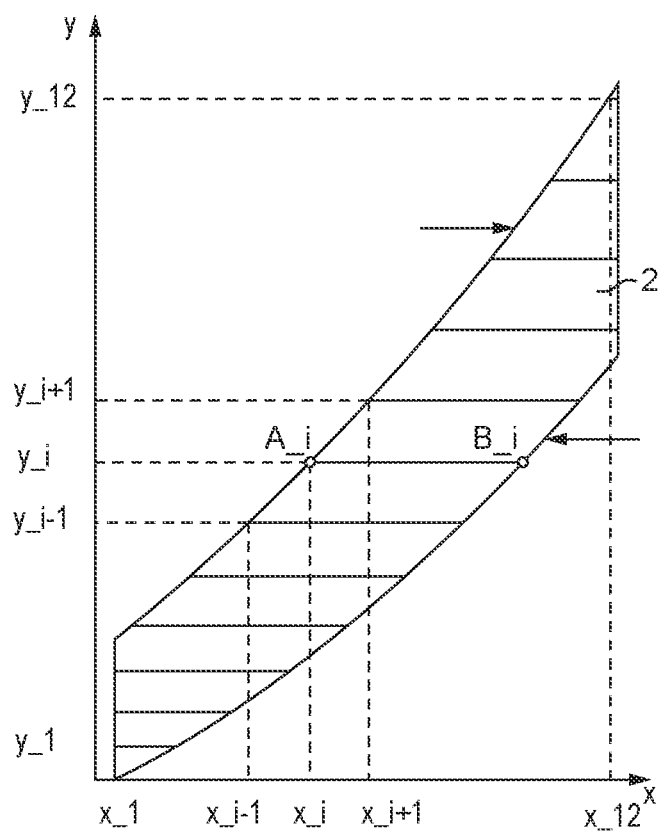
FIG. 4 is a graph illustrating in detail a plan of the preform layer used in FIG. 3 indicating a calculation of the preform shape and dimensions to be wrapped onto the mandrel in accordance with an embodiment of the present invention.

Referring to FIG. 4, this figure illustrates the shape and dimensions of the preform layer 2 used to form the elongate tube 28 of FIG. 3 when the preform layer is in a planar configuration relative to the rectangular coordinate system as described above. The y coordinate of the unwrapped planar preform layer 2, which applies to both the inner and outer edges 16, 18 at a given number of wrapped layers 34, is obtained by calculating the sum of all the circumferences of the perimeters of the previous wrapped layers 34.

In the case of a circular section, this leads to:

$$y_1^A = y_1^B = y_1 = 2 \cdot \pi \cdot r_1$$

$$y_1^A = y_1^B = y_i = \sum_{n=1}^{n=i} 2 \cdot \pi \cdot r_n$$

Again, for more complex tube geometries, this formula may be readily modified to define the shape and dimensions of only a part of a preform layer 2, which part is intended to be wrapped over less than one revolution of the mandrel 20, for example by calculating a proportion of the circumference $2\pi r_n$.

Since the wrapping is perpendicular to the axis of rotation R-R of the mandrel 20, the x coordinate of the inner edge 16 can be calculated as:

$$x_n^B = \sum_{n=1}^{n=i} e/\tan\alpha,$$

where e=thickness of the preform layer and i=total number of rotations of the wrapped preform layer at B.

The x coordinate of the outer edge 18 can be correspondingly calculated.

The x, y coordinates of the preform layer 2 can therefore be defined as:

$$A_i(x_i^A, r_i) \text{ and } B_i(x_i^B, r_i)$$

In the embodiment of FIGS. 1 and 2, a typical thickness of the preform layer 2 is 0.17 mm and typically the elongate tube 28 has a constant thickness comprised of 15 wrapped layers 34, i.e. a typical tube thickness of about 2.5 mm. However, other preform layer thicknesses, tube thicknesses and numbers of wrapped layers 34 may be used in accordance with the present invention.

Figure 14:
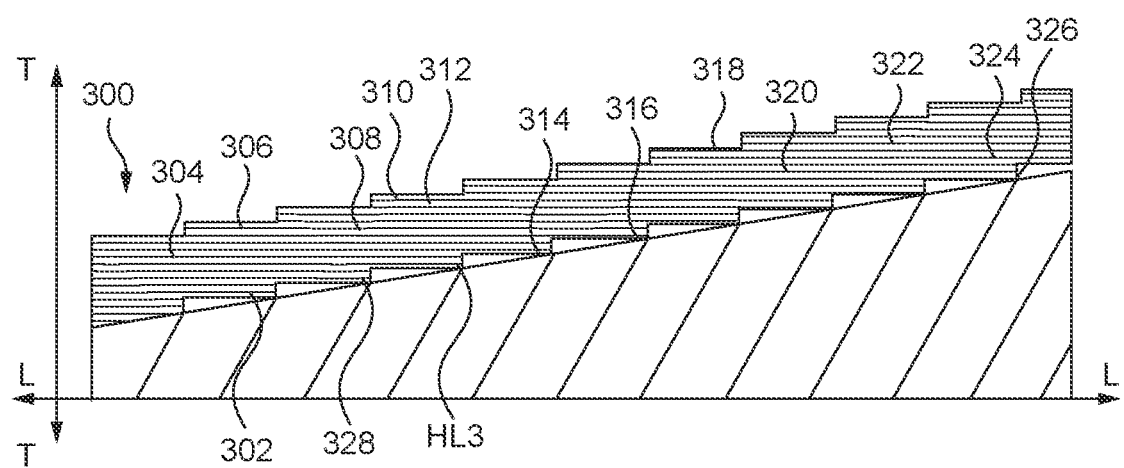
FIG. 14 illustrates schematically a longitudinal cross-sectional view though a part of an elongate tubular shaft comprised of a fibre-reinforced resin matrix composite material in accordance with a further embodiment of the present invention.

FIG. 14 illustrates schematically a part of an elongate tubular shaft 300 comprised of a fibre-reinforced resin matrix composite material 302 in accordance with a further embodiment of the present invention. The shaft 300 comprises an elongate tubular body 304 comprising a stack 306 of wrapped layers 308. Each wrapped layer 308 comprises fibrous reinforcement 310 in a resin matrix 312.

In FIG. 14, for the sake of clarity of illustration the dimensions of the various elements are not to scale and are exaggerated. In addition, the helical edges of the layers 308 are shown orthogonal to the longitudinal axis of the elongate tubular body 304, and so the inner and outer frusto-conical surfaces of the elongate tubular body 304 are shown as being stepped. However, in the physical manifestation of the embodiment, typically the wrapped layers 308 have such a small thickness, and the resin has flowed during the moulding process so as to be in contact with the entire outer circumferential surface of the mandrel and any outer mould part, so that in the moulded elongate tubular shaft 300 the helical edges of the layers would appear to the naked eye to be smoothly and continuously inclined at the outer and inner surfaces so as to be aligned with the overall frusto-conical shape of the elongate tubular shaft 300.

The elongate tubular body 304 has an inner elongate circumferential surface 314, which has a first surface part 316 having a non-cylindrical geometry along at least a part of a length of the elongate tubular body 304. In this embodiment, as also shown in FIG. 3, the non-cylindrical geometry is a frusto-conical shape. The elongate tubular body 304 also has an outer elongate circumferential surface 318, which in this embodiment, as also shown in FIG. 3, has a non-cylindrical geometry which is a frusto-conical shape.

The stack 306 of wrapped layers 308 of fibrous reinforcement 310 comprises a fibrous layer 320. The fibrous layer 320 comprises at least one ply of the fibrous reinforcement 310.

In a preferred embodiment, the fibrous reinforcement 310 comprises structural fibres that are constantly oriented with respect to a cylindrical coordinate system about the longitudinal axis L-L. Preferably, the structural fibres are comprised in a unidirectional (UD) fibrous ply.

The fibrous layer 320 is spirally wrapped about a longitudinal axis L-L of the elongate tubular body 304 to form the stack 306 of wrapped layers 308. Each wrapped layer 308 is parallel to the longitudinal axis L-L.

In a portion 322 of the stack 306 of wrapped layers 308 circumferentially surrounding the first surface part 316 the fibrous layer 320 has a non-constant width, as shown in FIG. 3, which varies non-linearly with a change in radius of the inner elongate circumferential surface 314 in the portion 322.

The fibrous reinforcement 310 comprises fibres 324 that are, along the length of the elongate tubular body 304, constantly oriented with respect to a cylindrical coordinate system about the longitudinal axis L-L of the elongate tubular body 304. The fibre orientation in any said portion 322 is independent of the geometry of the inner and outer elongate circumferential surfaces 314, 318 of that portion 322.

In this embodiment, along the first surface part 316 an inner edge 326 of the fibrous layer 320 is coincident with the inner circumferential surface 314 and forms a continuous inner helical line HL3, extending along a plurality of the wrapped layers 308. The continuous inner helical line HL3 has a uniform pitch between successive helical rotations of the wrapped layers 308. The continuous inner helical line HL3 typically extends along at least 10 of the wrapped layers 308.

In this embodiment, as is correspondingly also shown in FIGS. 1 to 3 with respect to the preform layer 2 used to form the elongate tubular body 304, at least a portion 328 of the inner edge 326 is curved relative to a transverse plane T-T extending orthogonal to the longitudinal axis L-L. Typically, the curved portion 328 of the inner edge 326 is convexly curved with respect to the fibrous layer 320.

In this embodiment, the outer elongate circumferential surface 318 has a non-cylindrical geometry and the elongate tubular body 304 has a constant thickness along at least a part of the length thereof. In other embodiments, as illustrated hereinafter with respect to FIGS. 9 to 13, the outer elongate circumferential surface may have a cylindrical geometry and/or the elongate tubular body may have a non-constant thickness along at least a part of the length thereof.

Figure 5A:
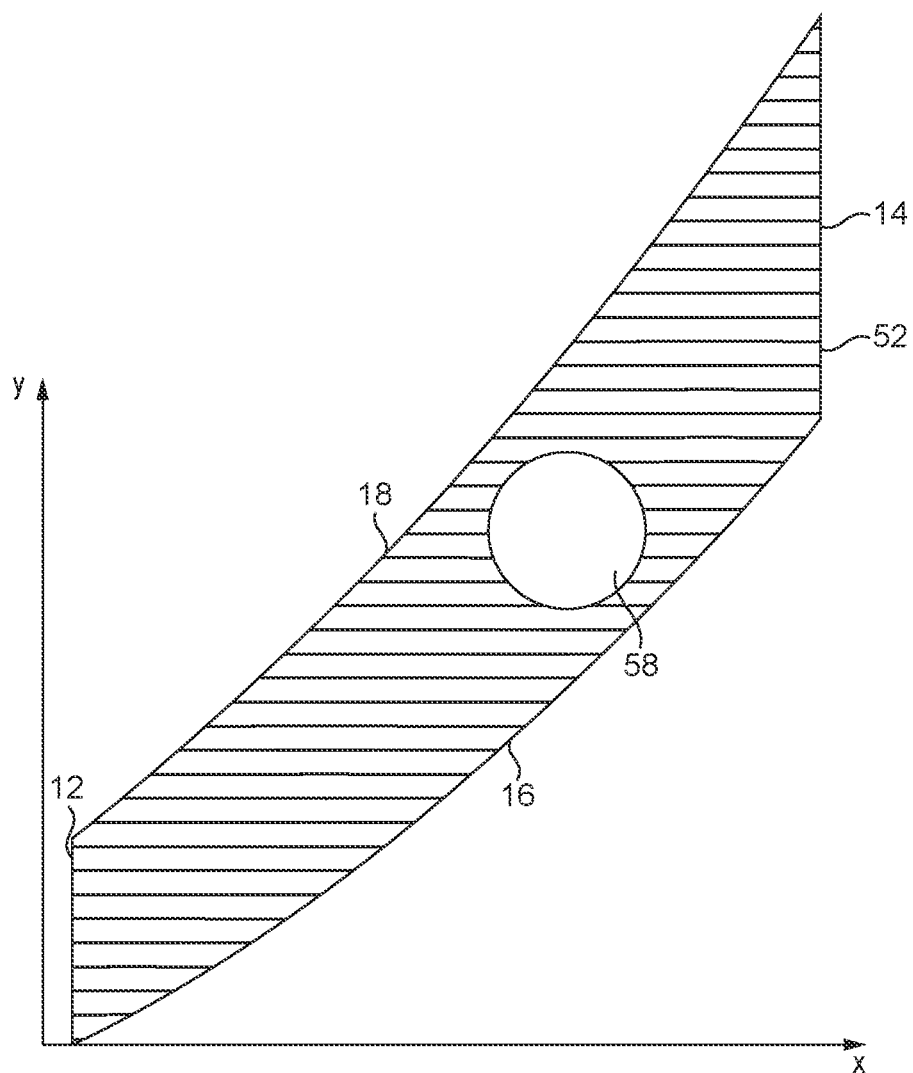
FIGS. 5a and 5b illustrate schematically, respectively, a plan view of a preform layer relative to a rectangular coordinate system, and a cross-section through the preform layer after wrapping around the mandrel in accordance with a second embodiment of the present invention.
Figure 5B:
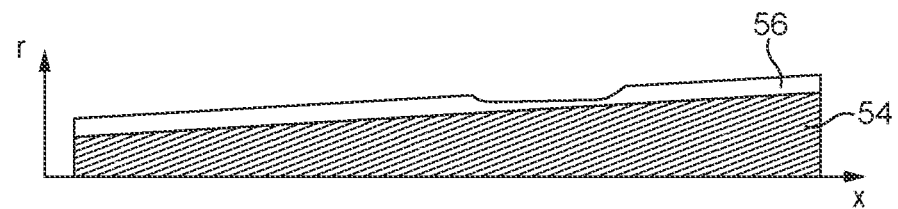

FIG. 5 illustrates a further embodiment of the present invention which is a modification of the embodiment of FIGS. 2a and 2b. FIG. 5a is a plan view of the flexible preform layer 52 shown relative to the x and y axes of the rectangular coordinate system and FIG. 5b shows the flexible preform layer 52 after wrapping about the frusto-conical mandrel 54 to form the elongate tube 56, which is subsequently moulded to form an elongate tubular shaft, which is frusto-conical and has a constant wall thickness. As compared to the embodiment of FIGS. 2a and 2b, the only modification is that the preform layer 52 comprises a hole 58 extending through a thickness of the preform layer 52. The hole 58 is positioned inwardly of the first and second end portions 12, 14 and the inner and outer edges 16, 18. The hole 58 is circular but may have any other shape and dimensions. A shown in FIG. 3b, the flexible preform layer 52 can be wrapped to form the elongate tube 56 and provide an opening, depression or cavity in the elongate tube 56. In other embodiments, plural holes may be present.

Figure 6A:
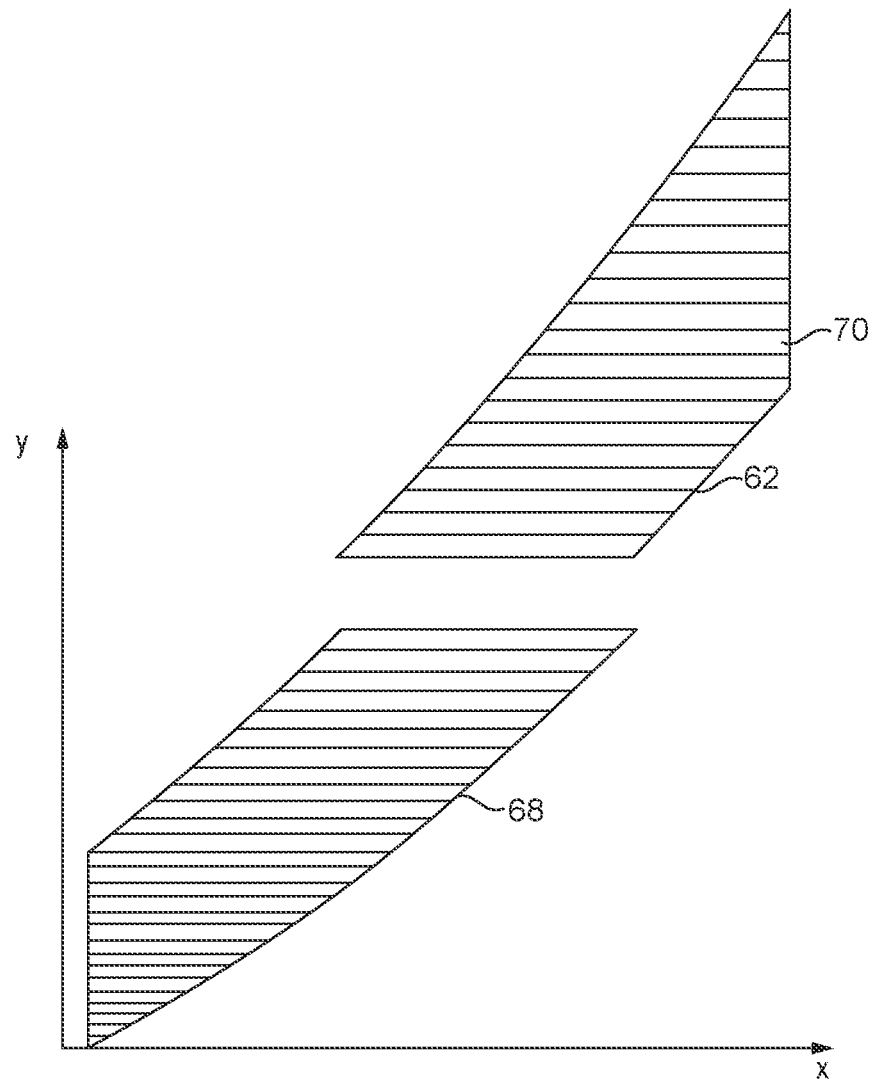
FIGS. 6a and 6b illustrate schematically, respectively, a plan view of a preform layer relative to a rectangular coordinate system, and a cross-section through the preform layer after wrapping around the mandrel in accordance with a third embodiment of the present invention.
Figure 6B:
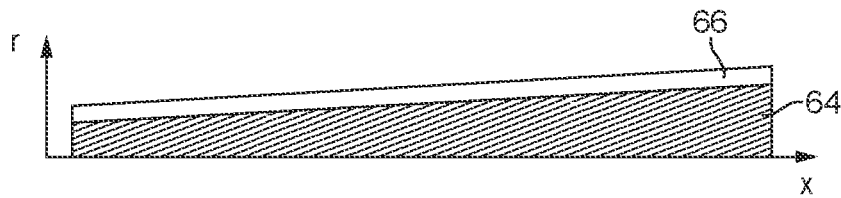

FIG. 6 illustrates a further embodiment of the present invention which is a further modification of the embodiment of FIGS. 2a and 2b. FIG. 6a is a plan view of the flexible preform layer 62 shown relative to the x and y axes of the rectangular coordinate system and FIG. 6b shows the flexible preform layer 62 after wrapping about the frusto-conical mandrel 64 to form the elongate tube 66, which is subsequently moulded to form an elongate tubular shaft, which is frusto-conical and has a constant wall thickness. As compared to the embodiment of FIGS. 2a and 2b, the only modification is that the preform layer 62 is comprised of first and second layer portions 68, 70 thereof. The first layer portion 68 is initially wrapped around the mandrel 64 as described above, and thereafter the second layer portion 70 is subsequently wrapped around the mandrel 64 as described above and at least partly over the first layer portion 68. Further layer portions may optionally be provided.

In the illustrated embodiment the first and second layer portions 68, 70 have the same thickness, and so a constant thickness elongate tube 66 is formed. However, the first and second layer portions 68, 70 may have different thickness so that elongate tube 66 has first and second thickness regions, preferably with a transition region therebetween.

Alternatively or additionally, the first and second layer portions 68, 70 may have different fibre reinforcements, resins, orientations, etc.

Figure 7A:
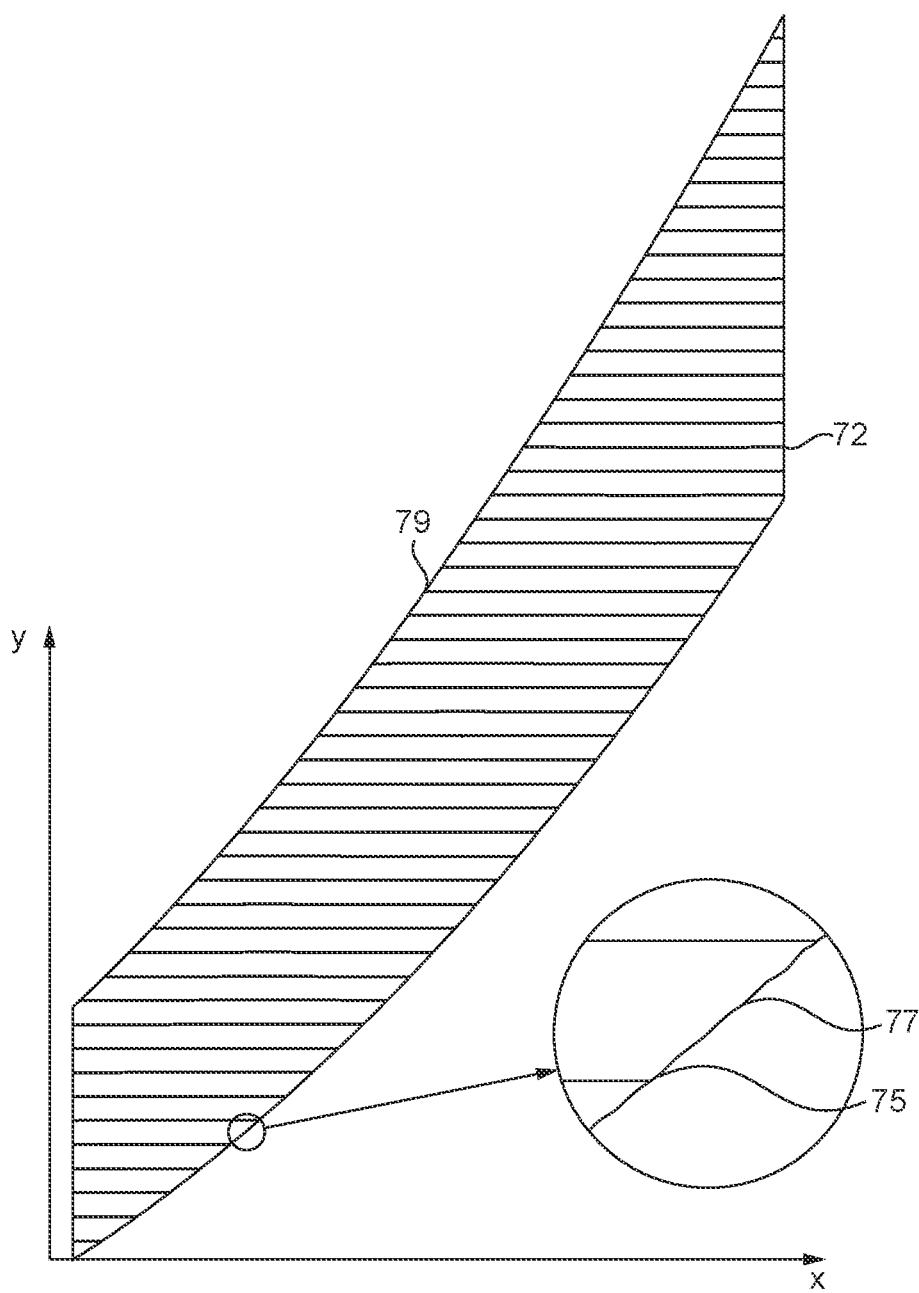
FIGS. 7a and 7b illustrate schematically, respectively, a plan view of a preform layer relative to a rectangular coordinate system, and a cross-section through the preform layer after wrapping around the mandrel in accordance with a fourth embodiment of the present invention.
Figure 7B:
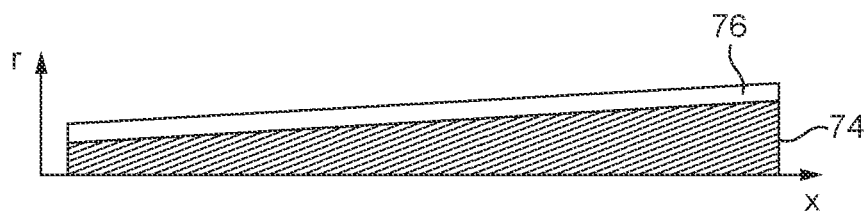

FIG. 7 illustrates a further embodiment of the present invention which is a further modification of the embodiment of FIGS. 2a and 2b. FIG. 7a is a plan view of the flexible preform layer 72 shown relative to the x and y axes of the rectangular coordinate system and FIG. 7b shows the flexible preform layer 72 after wrapping about the mandrel 74 to form the elongate tube 76, which is subsequently moulded to form an elongate tubular shaft, which has a constant wall thickness. As compared to the embodiment of FIGS. 2a and 2b, the only modification is that the mandrel 74, and consequently the elongate tube 76, is not frusto-conical with a circular cross-section but instead is frusto-pyramidal with a square cross-section.

As shown in FIG. 7a, the square profile of the elongate tube 76 can be incorporated into the calculation of an oscillating edge profile 77 on the inner and outer edges 75, 79 of the preform layer 72.

In alternative embodiments, the mandrel may have other non-circular cross-sections and may have any other regular (e.g. polygonal, elliptical) or non-regular shapes.

Figure 8A:
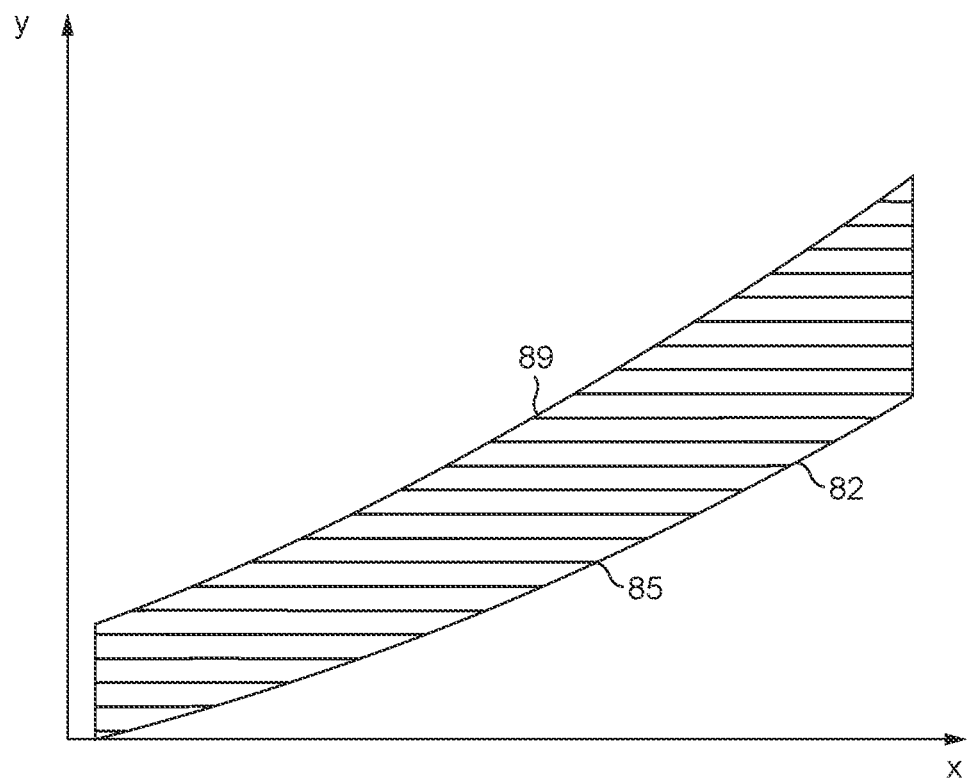
FIGS. 8a and 8b illustrate schematically, respectively, a plan view of a preform layer relative to a rectangular coordinate system, and a cross-section through the preform layer after wrapping around the mandrel in accordance with a fifth embodiment of the present invention.
Figure 8B:
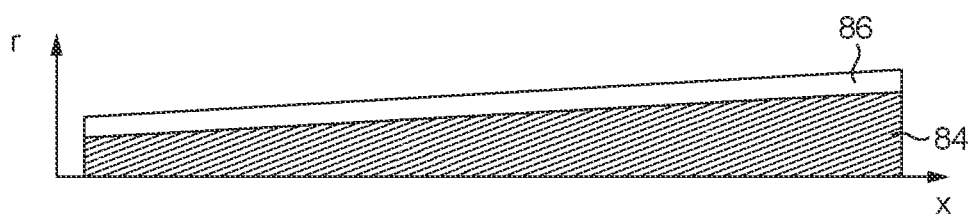

FIG. 8 illustrates a further embodiment of the present invention which is a further modification of the embodiment of FIGS. 2a and 2b. FIG. 8a is a plan view of the flexible preform layer 82 shown relative to the x and y axes of the rectangular coordinate system and FIG. 8b shows the flexible preform layer 82 after wrapping about the mandrel 84 to form the elongate tube 86, which is subsequently moulded to form an elongate tubular shaft, which has a constant wall thickness. As compared to the embodiment of FIGS. 2a and 2b, the only modification is that the thickness of the preform layer 82 is increased, and consequently for a given thickness of the elongate tube 86 the number of wrapper layers is decreased.

In the embodiment of FIG. 8, a typical thickness of the preform layer is 0.215 mm and typically the elongate tube has a constant thickness comprised of 8 wrapped layers, i.e. a typical tube thickness of about 1.7 mm.

It may be seen, from a comparison of FIGS. 2 and 8, that changing the preform thickness also changes the geometry of the curvature of the inner and outer edges 85, 89 of the preform layer 82; this is because, as described above, the thickness of the preform layer 82 is a variable in the calculation of the shape and configuration of the preform layer 82 to produce a given elongate tube geometry.

Figure 9A:
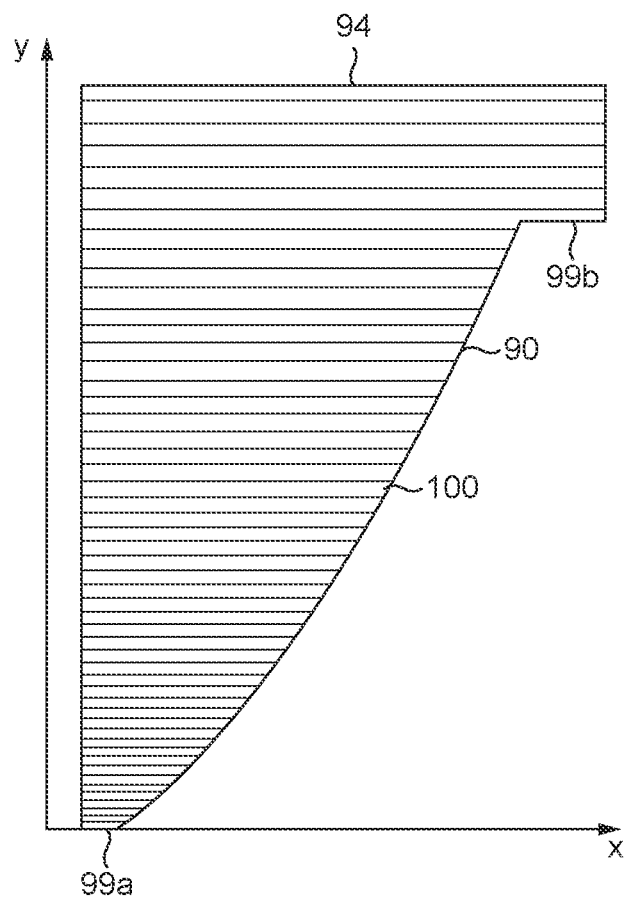
FIGS. 9a and 9b illustrate schematically, respectively, a plan view of a preform layer relative to a rectangular coordinate system, and a cross-section through the preform layer after wrapping around the mandrel in accordance with a sixth embodiment of the present invention.
Figure 9B:
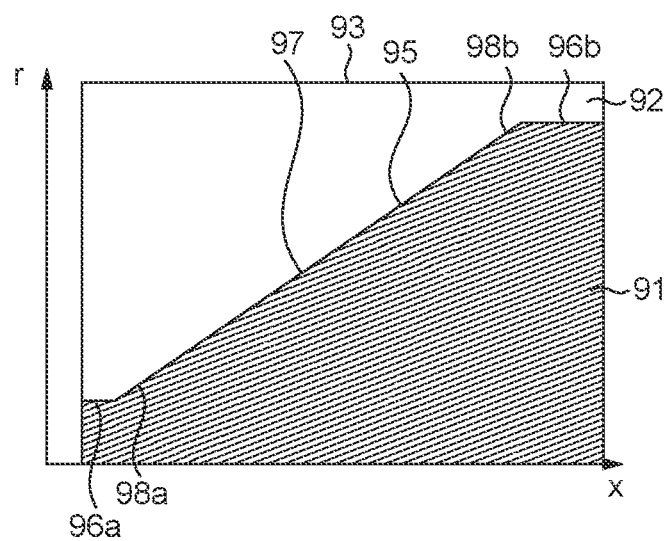

FIG. 9 illustrates a further embodiment of the present invention which is a further modification of the embodiment of FIGS. 2a and 2b. FIG. 9a is a plan view of the flexible preform layer 90 shown relative to the x and y axes of the rectangular coordinate system and FIG. 9b shows the flexible preform layer 90 after wrapping about the mandrel 91 to form the elongate tube 92, which is subsequently moulded to form an elongate tubular shaft, which has a non-constant wall thickness.

The preform layer 90 and mandrel 91 are shaped and dimensioned to form a cylindrical outer surface 93 of the elongate tube 92. In particular, the outer edge 94 is linear and parallel with the axis of rotation, instead of being concavely curved as in the embodiment of FIGS. 2 to 8.

As compared to the embodiment of FIGS. 2a and 2b, the outer circumferential surface 95 of the mandrel 91 further comprises a cylindrical surface 96a, 96b adjacent to the frusto-conical surface 97 at at least one end 98a, 98b of the frusto-conical surface 97. The preform layer 90 is shaped and dimensioned so that when the preform layer 90 is in a planar configuration a respective second portion 99a, 99b of the inner edge 100, that in the wrapping step contacts the cylindrical surface 96a, 96b, is linear and parallel with the axis of rotation, and the longitudinal axis, in the wrapping step.

Figure 10A:
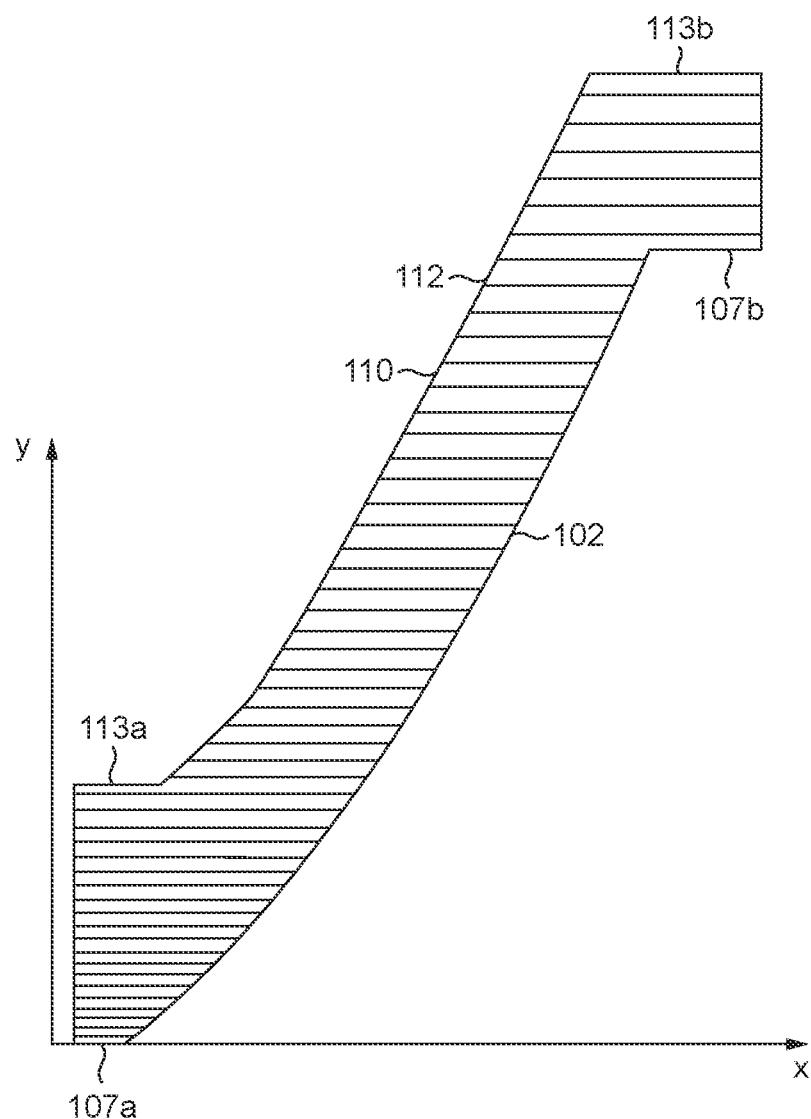
FIGS. 10a and 10b illustrate schematically, respectively, a plan view of a preform layer relative to a rectangular coordinate system, and a cross-section through the preform layer after wrapping around the mandrel in accordance with a seventh embodiment of the present invention.
Figure 10B:
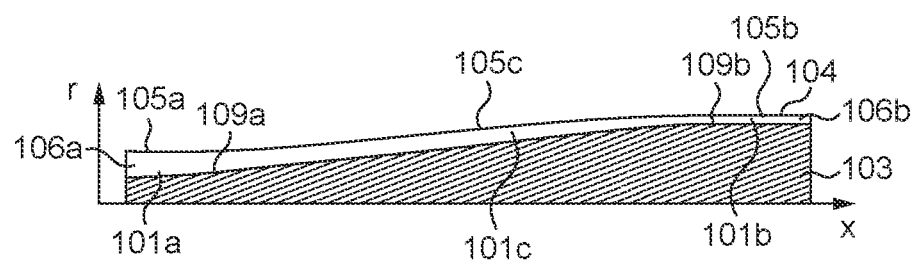

FIG. 10 illustrates a further embodiment of the present invention which is a further modification of the embodiment of FIGS. 2a and 2b. FIG. 10a is a plan view of the flexible preform layer 102 shown relative to the x and y axes of the rectangular coordinate system and FIG. 10b shows the flexible preform layer 102 after wrapping about the mandrel 103 to form the elongate tube 104, which is subsequently moulded to form an elongate tubular shaft, which has a non-constant wall thickness.

The preform layer 102 and mandrel 103 are shaped and dimensioned to form first and second cylindrical outer surfaces 105a, 105b at opposite ends 106a, 106b of the elongate tube 104, and a conical outer surface 105c interconnects the first and second cylindrical outer surfaces 105a, 105b. In addition, the first and second cylindrical outer surfaces 105a, 105b are external to respective first and second cylindrical wall portions 101a, 101b. The first cylindrical wall portion 101a has a wall thickness that is greater than the wall thickness of the second cylindrical wall portion 101b. The conical outer surface 105c is external to a conical wall portion 101c that progressively increases in wall thickness from the first cylindrical wall portion 101a to the second cylindrical wall portion 101b.

The preform layer 102 is shaped and dimensioned so that when the preform layer 102 is in a planar configuration a respective second portion 107a, 107b of the inner edge 108, that in the wrapping step contacts the cylindrical surfaces 109a, 109b of the mandrel 103, is linear and parallel with the axis of rotation, and the longitudinal axis in the wrapping step. In addition, the preform layer 102 is shaped and dimensioned so that the outer edge 110 comprises a central curved portion 112 between opposite linear portions 113a, 113b. Each respective opposite linear portion 113a, 113b of the outer edge 110, that in the wrapping step is remote from the cylindrical surfaces 109a, 109b of the mandrel 103, is linear and parallel with the axis of rotation, and the longitudinal axis in the wrapping step.

Figure 11A:
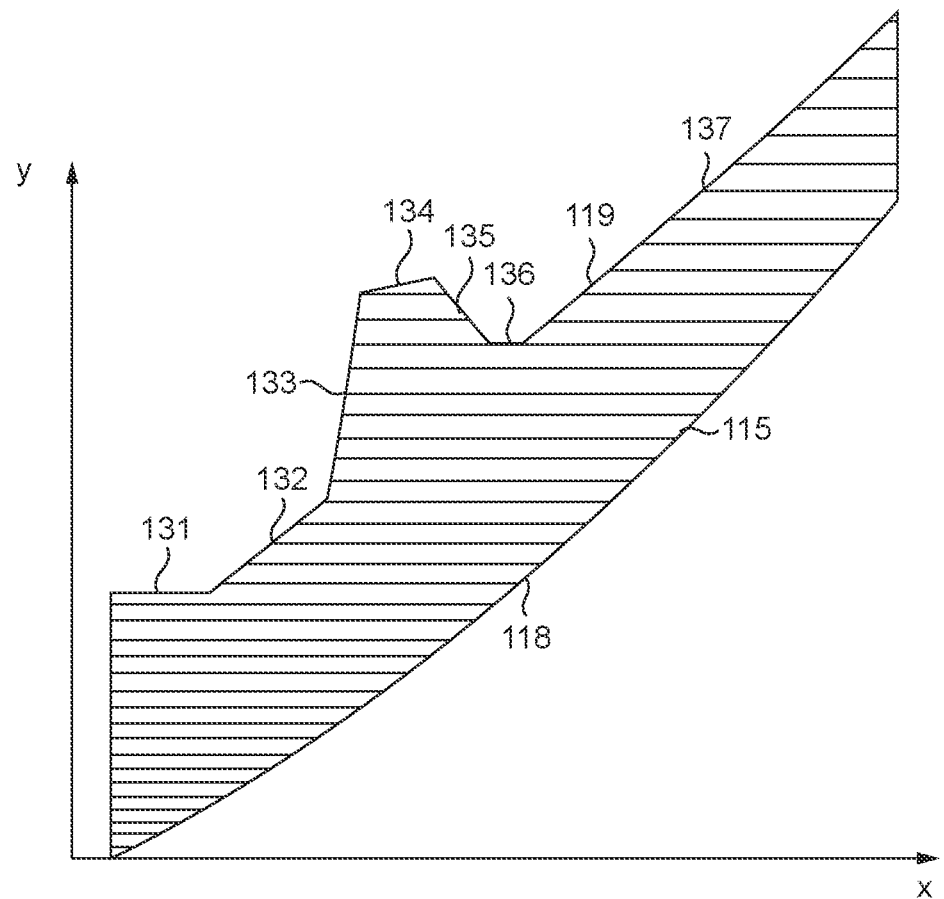
FIGS. 11a and 11b illustrate schematically, respectively, a plan view of a preform layer relative to a rectangular coordinate system, and a cross-section through the preform layer after wrapping around the mandrel in accordance with an eighth embodiment of the present invention.
Figure 11B:
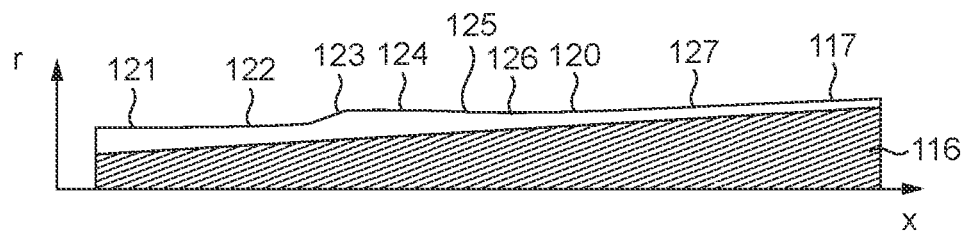

FIG. 11 illustrates a further embodiment of the present invention which is a further modification of the embodiment of FIGS. 2a and 2b. FIG. 11a is a plan view of the flexible preform layer 115 shown relative to the x and y axes of the rectangular coordinate system and FIG. 11b shows the flexible preform layer 115 after wrapping about the mandrel 116 to form the elongate tube 117, which is subsequently moulded to form an elongate tubular shaft, which has a non-constant wall thickness.

The inner edge 118 of the preform layer 115 and the mandrel 116 are shaped and dimensioned the same as for the embodiment of FIGS. 2a and 2b to have a constant angle of inclination for a frusto-conical shape. However, the outer edge 119 of the preform layer 115 is shaped and dimensioned to form an outer surface 120 of the elongate tube 117 which has varying geometry and dimensions. In particular, the outer surface 120 has a first cylindrical portion 121, a first inclined portion 122 at a first inclination angle, a second inclined portion 123 at a second inclination angle, a third inclined portion 124 at a third inclination angle, a fourth inclined portion 125 at a fourth inclination angle, a second cylindrical portion 126 and a fifth inclined portion 127 at a fifth inclination angle.

Using the calculations as described above for the previous embodiments, the outer edge 119 of the preform layer 115 is shaped and dimensioned to provide a first linear portion 131 to form the first cylindrical portion 121, a first curved portion 132 to form the first inclined portion 122, a second curved portion 133 to form the second inclined portion 123, a third curved portion 134 to form the third inclined portion 124, a fourth curved portion 135 to form the fourth inclined portion 125, a second linear portion 136 to form the second cylindrical portion 126 and a fifth curved portion 137 to form the fifth inclined portion 127.

Figure 12A:
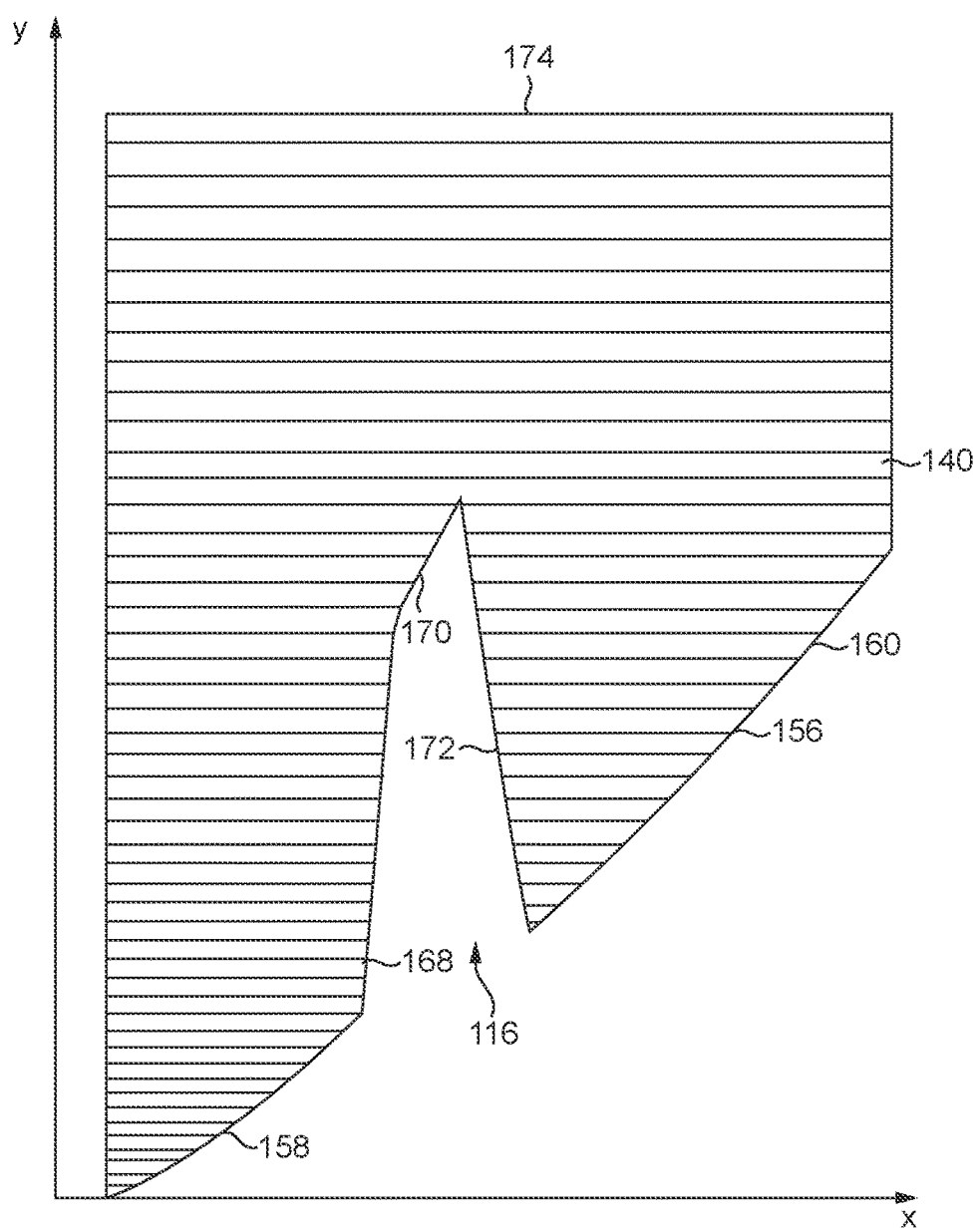
FIGS. 12a and 12b illustrate schematically, respectively, a plan view of a preform layer relative to a rectangular coordinate system, and a cross-section through the preform layer after wrapping around the mandrel in accordance with a ninth embodiment of the present invention.
Figure 12B:
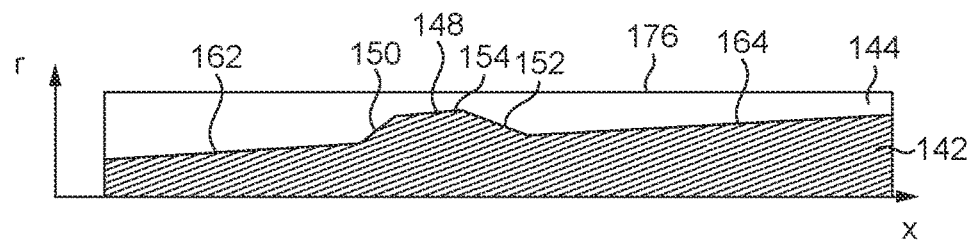

FIG. 12 illustrates a further embodiment of the present invention which is a further modification of the embodiment of FIGS. 2a and 2b. FIG. 12a is a plan view of the flexible preform layer 140 shown relative to the x and y axes of the rectangular coordinate system and FIG. 12b shows the flexible preform layer 140 after wrapping about the mandrel 142 to form the elongate tube 144, which is subsequently moulded to form an elongate tubular shaft, which has a non-constant wall thickness.

The mandrel 142 is shaped and dimensioned the same as for the embodiment of FIGS. 2a and 2b to have a constant angle of inclination for a frusto-conical shape, except that the mandrel 142 incorporates an outward circumferential protrusion 148 having oppositely inclined frusto-conical faces 150, 152, having different inclination angles to the longitudinal axis of the mandrel 142, on opposite edges of a central inclined face 154.

Using the calculations as described above for the previous embodiments, the inner edge 156 of the preform layer 140 has opposite lower and upper curved portions 158, 160 for wrapping around the lower and upper inclined portions 162, 164 of the mandrel 142 on opposite edges of the protrusion 148. The inner edge 156 further has an inwardly oriented notch 166 for wrapping around the protrusion 148. The notch 166 is defined by a first curved portion 168 to wrap around the lower frusto-conical face 150, a second curved portion 170 to wrap around the central inclined face 154, and a third curved portion 172 to wrap around the upper frusto-conical face 152.

The outer edge 174 of the preform layer 140 is linear and parallel to the axis of rotation to form an outer surface 176 of the elongate tube 144 which is cylindrical, as in the embodiment of FIG. 9.

Figure 13A:
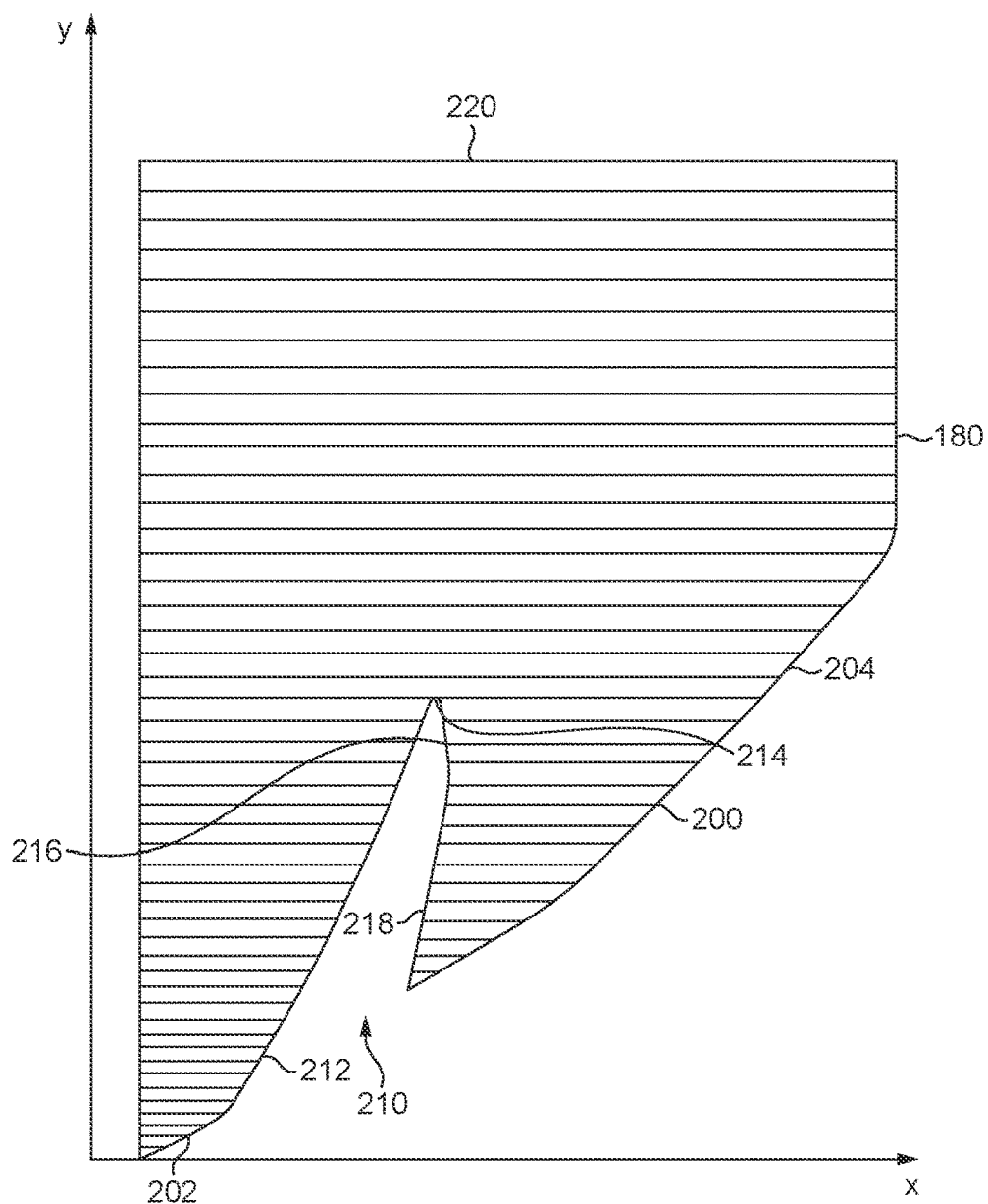
FIGS. 13a and 13b illustrate schematically, respectively, a plan view of a preform layer relative to a rectangular coordinate system, and a cross-section through the preform layer after wrapping around the mandrel in accordance with a tenth embodiment of the present invention.
Figure 13B:
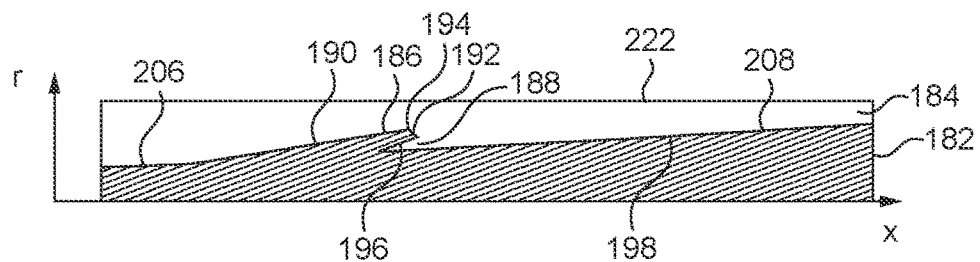

FIG. 13 illustrates a further embodiment of the present invention which is a further modification of the embodiment of FIG. 12. FIG. 13a is a plan view of the flexible preform layer 180 shown relative to the x and y axes of the rectangular coordinate system and FIG. 13b shows the flexible preform layer 180 after wrapping about the mandrel 182 to form the elongate tube 184, which is subsequently moulded to form an elongate tubular shaft, which has a non-constant wall thickness.

The mandrel 182 is shaped and dimensioned the same as for the embodiment of FIG. 12 to have a constant angle of inclination for a frusto-conical shape, except that the mandrel 182 incorporates an outward circumferential protrusion 186 which has a re-entrant groove 188. The protrusion 186 has oppositely inclined frusto-conical faces 190, 192, having different inclination angles to the longitudinal axis of the mandrel 182, on opposite sides of a central cylindrical face 194 and the groove 188 is defined by a re-entrant inclined face 196 which connects between the frusto-conical face 192 and the primary outer frusto-conical surface 198 of the frusto-conical shaped mandrel 182.

Using the calculations as described above for the previous embodiments, the inner edge 200 of the preform layer 180 has opposite lower and upper curved portions 202, 204 for wrapping around the lower and upper inclined portions 206, 208 of the mandrel 182 on opposite sides of the protrusion 186. The inner edge 200 further has an inwardly oriented notch 210 for wrapping around the protrusion 186. The notch 210 is defined by a first curved portion 212 to wrap around the lower frusto-conical face 190, a first linear portion 214 to wrap around the central cylindrical face 194, a second curved portion 216 to wrap around the upper frusto-conical face 192, and a third curved portion 218 to fill in the groove 188 between the re-entrant inclined face 196 and the upper inclined portion 208 of the primary outer frusto-conical surface 198.

The outer edge 220 of the preform layer 180 is linear and parallel to the axis of rotation to form an outer surface 222 of the elongate tube 184 which is cylindrical, as in the embodiment of FIG. 12.

The method to manufacture the elongate tubular shaft comprised of a fibre-reinforced resin matrix composite material according to the present invention is not limited to the above-detailed embodiments. In particular, in further embodiments (not shown) of the present invention, the mandrel may have any combination of circumferential shapes, dimensions and cross-sectional shapes. The number of preform layers wound around the mandrel may also be greater than one. Furthermore, the number of plies of the preform layer may be one or more than one and the orientation of the fibres of the plies relative to the direction of the preform layer that is parallel with the axis of rotation may be any angle suitable for providing a desired performance of the composite structure. In some preferred embodiments of the method of the present invention should be chosen so as to form a fibre-reinforced composite structure, in a proportion (for example by weight) of unidirectional fibres having a direction along the axis of the tubular shaft, which are beneficial for the main performance of the composite structure, is greater than the proportion (for example by weight) of fibres, which may optionally be unidirectional fibres, obliquely orientated relative to that direction.

The invention claimed is:

1. A method of manufacturing an elongate tubular shaft comprised of a fibre-reinforced resin matrix composite material, the method comprising the steps of:
   a) providing an elongate mandrel, the mandrel having a longitudinal axis, opposite first and second ends which are mutually spaced along the longitudinal axis, and an outer circumferential surface that is non-cylindrical along at least a part of a length of the mandrel extending along the longitudinal axis;
   b) providing a preform layer comprising a fibrous reinforcement, the preform layer having first and second end portions, which are mutually spaced, and inner and outer edges, which are mutually spaced, the inner and outer edges extending from the first end portion towards the second end portion, wherein when the preform layer is in a planar configuration at least the inner edge is non-linear and a spacing between the inner and outer edges varies along a length of the preform layer extending between the first and second end portions;

c) locating the first end portion of the preform layer adjacent to the first end of the mandrel in a starting configuration in which the inner edge is oriented towards the mandrel and the outer edge is oriented away from the mandrel;

d) wrapping the preform layer about the mandrel so that the outer circumferential surface of the mandrel is progressively covered by the wrapped preform layer to form an elongate tube, whereby in the elongate tube the inner edge contacts the outer circumferential surface of the mandrel and the outer edge is located at an outer circumferential surface of the elongate tube, wherein during the wrapping step the mandrel and the preform layer are relatively rotated about an axis of rotation that is along the longitudinal axis of the mandrel and the preform layer is continuously fed, from the first end portion to the second end portion of the preform layer, onto the mandrel along a feeding path which is perpendicular to the longitudinal axis of the mandrel; and e) moulding the elongate tube on the mandrel to form an elongate tubular shaft comprised of a fibre-reinforced resin matrix composite material formed from the preform layer;

wherein before or during step e) a resin material is provided in contact with the fibrous reinforcement of the preform layer, and during step e) the resin material forms a resin matrix which incorporates the fibrous reinforcement;

wherein in step b) the inner edge of the preform layer is shaped and dimensioned so that in step d) the inner edge is continuously coincident with the outer circumferential surface of the mandrel and the elongate tube comprises a plurality of wrapped layers forming a spiral about the longitudinal axis, wherein each wrapped layer is parallel to the longitudinal axis.

2. The method of claim 1 wherein each wrapped layer is wrinkle-free and each region of the wrapped layer is consistently aligned with the longitudinal axis.

3. The method of claim 1 wherein in step d) along at least a part of the length of the elongate tube a contact between at least a portion of the inner edge and a region of the outer circumferential surface of the mandrel that is non-cylindrical forms a continuous inner helical line, extending along a plurality of the wrapped layers, which is coincident with the outer circumferential surface of the mandrel.

4. The method of claim 3 wherein the continuous inner helical line has a uniform pitch between successive helical rotations of the wrapped layers.

5. The method according to claim 3 wherein the continuous inner helical line extends along at least 2 wrapped layers of the wrapped preform layer.

6. The method of claim 1 wherein in step b) the preform layer is shaped and dimensioned so that when the preform layer is in a planar configuration at least a portion of the inner edge is curved.

7. The method according to claim 6 wherein in step b) the preform layer is shaped and dimensioned so that when the preform layer is in a planar configuration the portion of the inner edge is convexly curved.

8. The method of claim 1 wherein in step (b) the preform layer is shaped and dimensioned so that when the preform is in a planar configuration at least a portion of the inner edge is defined, using a rectangular coordinate system having x and y axes, wherein the x axis is parallel to a spacing between the first and second end portions, and parallel to the axis of rotation, and the y axis is parallel to a spacing between the inner and outer edges, by the relationship:

$$Bn = f(x_n^B, y_n^B),$$

where
B is the position of the inner edge relative to the rectangular coordinate system;
n=the number of rotations of the wrapped preform layer;

$$x_n^B = f(c, e),$$

where c=circumference of wrapped preform layer at Bn and e=thickness of the preform layer; and $$yi = \sum_{n=1}^{n=i} c,$$

where i=the total number of rotations of the wrapped preform layer at B.

9. The method according to claim 1 wherein the outer circumferential surface that is non-cylindrical is frusto-conical.

10. The method according to claim 9 wherein the outer circumferential surface further comprises a cylindrical surface adjacent to the frusto-conical surface at least one end of the frusto-conical surface, and in step b) the preform layer is shaped and dimensioned so that when the preform layer is in a planar configuration a second portion of the inner edge, that in step d) contacts the cylindrical surface, is linear and parallel with the longitudinal axis in steps c) and d).

11. The method according to claim 9 wherein the outer circumferential surface further comprises a second frusto-conical surface inclined in an opposite direction to the frusto-conical surface, the second frusto-conical surface being adjacent to or spaced from an end of the frusto-conical surface, and in step b) the preform layer is shaped and dimensioned so that when the preform layer is in a planar configuration a third portion of the inner edge, that in step d) contacts the second frusto-conical surface, is part of a concave opening cut into the inner edge and inclined to the longitudinal axis in steps c) and d).

12. The method according to claim 9 wherein the frusto-conical surface is inclined at an angle α to the longitudinal axis of the mandrel and in step (b) the preform layer is shaped and dimensioned so that when the preform is in a planar configuration the curved portion of the inner edge is defined, using a rectangular coordinate system having x and y axes, wherein the x axis is parallel to a spacing between the first and second end portions, and parallel to the axis of rotation, and the y axis is parallel to a spacing between the inner and outer edges, by the relationship:

$$Bn = f(x_n^B, y_n^B),$$

where
B is the position of the inner edge relative to the rectangular coordinate system;
n=the number of rotations of the wrapped preform layer;

$$x_n^B = \sum_{n=1}^{n=i} e/\tan\alpha,$$

where e=thickness of the preform layer and i=total number of rotations of the wrapped preform layer at B; and $$y_n^B = \sum_{n=1}^{n=i} 2\pi r_n,$$

where $r_n$=radius of the mandrel at rotation n.

13. The method according to claim 1 wherein in step b) the preform layer is shaped and dimensioned so that when the preform layer is in a planar configuration at least a portion of the outer edge, opposite to the inner edge, is concavely curved and/or convexly curved, and wherein in step d) along at least a part of the length of the elongate tube the curved portion of the outer edge forms a continuous outer helical line.

14. The method according to claim 13, wherein in step d) along at least a part of the length of the elongate tube a contact between at least a portion of the inner edge and a region of the outer circumferential surface of the mandrel that is non-cylindrical forms a continuous inner helical line, extending along a plurality of the wrapped layers, which is coincident with the outer circumferential surface of the mandrel and wherein the continuous outer helical line is equidistant from the continuous inner helical line along the plurality of wrapped layers so that the elongate tube has a constant thickness along the part thereof.

15. The method according to claim 1 wherein in step b) the preform layer is shaped and dimensioned so that when the preform layer is in a planar configuration at least a portion of the outer edge is linear, and wherein in steps c) and d) the linear portion of the outer edge is parallel with the longitudinal axis in steps c) and d) and the outer surface of the elongate tube formed by the linear portion is cylindrical.

16. The method according to claim 15 wherein the outer circumferential surface further comprises a cylindrical surface adjacent to the frusto-conical surface at least one end of the frusto-conical surface, and in step b) the preform layer is shaped and dimensioned so that when the preform layer is in a planar configuration a second portion of the inner edge, that in step d) contacts the cylindrical surface, is linear and parallel with the longitudinal axis in steps c) and d).

17. The method according to claim 15 wherein the outer circumferential surface further comprises a second frusto-conical surface inclined in an opposite direction to the frusto-conical surface, the second frusto-conical surface being adjacent to or spaced from an end of the frusto-conical surface, and the preform layer is shaped and dimensioned so that when the preform layer is in a planar configuration a third portion of the inner edge, that in step d) contacts the second frusto-conical surface, is part of a concave opening cut into the inner edge and inclined to the longitudinal axis in steps c) and d).

18. The method according to claim 1 wherein the fibrous reinforcement comprises structural fibres that during step c) are aligned in parallel with the longitudinal axis and during step d) are maintained constantly oriented with respect to a cylindrical coordinate system about the longitudinal axis and wherein the structural fibres are comprised in a unidirectional (UD) fibrous ply.

19. The method according to claim 1 wherein the preform layer comprises one or more than one hole extending through a thickness of the preform layer, each of the one or more than one hole being positioned inwardly of the first and second end portions and the inner and outer edges.

* * * * *